US008566413B2

(12) United States Patent
Horvitz

(10) Patent No.: US 8,566,413 B2
(45) Date of Patent: Oct. 22, 2013

(54) BOUNDED-DEFERRAL POLICIES FOR GUIDING THE TIMING OF ALERTING, INTERACTION AND COMMUNICATIONS USING LOCAL SENSORY INFORMATION

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 943 days.

(21) Appl. No.: 12/259,157

(22) Filed: Oct. 27, 2008

(65) Prior Publication Data

US 2009/0099992 A1    Apr. 16, 2009

Related U.S. Application Data

(63) Continuation of application No. 10/611,491, filed on Jun. 30, 2003, now Pat. No. 7,444,383, which is a continuation-in-part of application No. 10/220,419, filed on Aug. 30, 2002, now Pat. No. 7,243,130, and a continuation-in-part of application No. 10/220,550, filed on Aug. 30, 2002, now Pat. No. 8,024,415, and a continuation-in-part of application No. 09/881,502, filed on Jun. 14, 2001, now abandoned.

(60) Provisional application No. 60/450,841, filed on Feb. 28, 2003, provisional application No. 60/212,296, filed on Jun. 17, 2000.

(51) Int. Cl.
*G06F 15/16* (2006.01)

(52) U.S. Cl.
USPC ............ 709/207; 709/203; 709/206; 709/224

(58) Field of Classification Search
USPC .................. 709/207, 206, 203, 223, 224, 245
See application file for complete search history.

(56) References Cited

U.S. PATENT DOCUMENTS

| | | |
|---|---|---|
| 4,789,962 A | 12/1988 | Berry et al. |
| 5,377,354 A | 12/1994 | Scannell et al. |

(Continued)

FOREIGN PATENT DOCUMENTS

| | | |
|---|---|---|
| EP | 0413537 | 2/1991 |
| EP | 0420779 | 4/1991 |

(Continued)

OTHER PUBLICATIONS

U.S. Appl. No. 60/189,801, filed Mar. 2000, Horvitz, et al.

(Continued)

*Primary Examiner* — El Hadji Sall
(74) *Attorney, Agent, or Firm* — Merchant & Gould P.C.

(57) ABSTRACT

The present invention relates to a system and method to facilitate communications of important messages, communications, or interactions. Policies are introduced that consider a user's current situation, including the cost of interrupting the user, or directly sensed surrogates for such a cost, and decide on a suitable time, within a deadline for delivering the information or establishing a communication. Deadlines for delivery are determined based on the urgency of the information that is inferred or detected from the message sender, type, and content. If a suitable context is not detected within a deadline, the information is delivered at the deadline. If it is determined that a suitable context will not achieved within a deadline, the information is transmitted immediately. Suitable contexts for delivery can be determined via the use of one or more sensors on or near endpoint devices, including accelerometers, microphones, touch sensing, and gaze and head pose detection. Other information, including appointment status as indicated on a user's calendar, the time of day, and previously assessed patterns of availability can be employed in decisions about the deferral of alerts. Endpoint sensors, calendar information, and patterns of availability also may be used to identify the likelihood that information will be received at a device. Such information can be passed back directly or in a summary form as the likelihood of transmission success to a central notification manager or used locally in decisions about the salience and repetition of alerting.

11 Claims, 17 Drawing Sheets

(56) References Cited

U.S. PATENT DOCUMENTS

| | | |
|---|---|---|
| 5,423,043 A | 6/1995 | Fitzpatrick et al. |
| 5,471,399 A | 11/1995 | Tanaka et al. |
| 5,493,692 A | 2/1996 | Theimer et al. |
| 5,508,817 A | 4/1996 | Kunigami |
| 5,544,321 A | 8/1996 | Theimer et al. |
| 5,555,346 A | 9/1996 | Gross et al. |
| 5,555,376 A | 9/1996 | Theimer |
| 5,603,054 A | 2/1997 | Theimer et al. |
| 5,611,050 A | 3/1997 | Theimer et al. |
| 5,615,325 A | 3/1997 | Peden |
| 5,617,526 A | 4/1997 | Oran et al. |
| 5,644,363 A | 7/1997 | Mead |
| 5,717,877 A | 2/1998 | Orton et al. |
| 5,736,974 A | 4/1998 | Selker |
| 5,742,905 A | 4/1998 | Pepe et al. |
| 5,751,965 A | 5/1998 | Mayo et al. |
| 5,757,916 A | 5/1998 | MacDoran et al. |
| 5,767,852 A | 6/1998 | Keller et al. |
| 5,784,124 A | 7/1998 | D'Alitalia et al. |
| 5,790,974 A * | 8/1998 | Tognazzini ............... 455/456.5 |
| 5,812,865 A * | 9/1998 | Theimer et al. ............ 709/228 |
| 5,831,545 A | 11/1998 | Murray et al. |
| 5,852,440 A | 12/1998 | Grossman et al. |
| 5,859,640 A | 1/1999 | de Judicibus |
| 5,864,848 A * | 1/1999 | Horvitz et al. ................. 1/1 |
| 5,928,330 A | 7/1999 | Goetz et al. |
| 5,973,612 A | 10/1999 | Deo et al. |
| 5,987,234 A | 11/1999 | Hirosawa et al. |
| 6,021,403 A | 2/2000 | Horvitz |
| 6,023,723 A | 2/2000 | McCormick et al. |
| 6,055,505 A | 4/2000 | Elston |
| 6,057,842 A | 5/2000 | Knowlton et al. |
| 6,067,477 A | 5/2000 | Wewalaarachchi et al. |
| 6,067,565 A | 5/2000 | Horvitz |
| 6,078,322 A | 6/2000 | Simonoff et al. |
| 6,092,068 A | 7/2000 | Dinkelacker |
| 6,094,681 A | 7/2000 | Shaffer et al. |
| 6,101,531 A | 8/2000 | Eggleston et al. |
| 6,119,014 A | 9/2000 | Alperovich et al. |
| 6,144,363 A | 11/2000 | Alloul et al. |
| 6,147,675 A | 11/2000 | Liu |
| 6,154,778 A | 11/2000 | Koistinen et al. |
| 6,161,130 A | 12/2000 | Horvitz et al. |
| 6,167,448 A | 12/2000 | Hemphill et al. |
| 6,256,664 B1 | 7/2001 | Donoho et al. |
| 6,262,730 B1 | 7/2001 | Horvitz et al. |
| 6,289,380 B1 | 9/2001 | Battat et al. |
| 6,295,543 B1 | 9/2001 | Block et al. |
| 6,301,609 B1 | 10/2001 | Aravamudan et al. |
| 6,327,581 B1 | 12/2001 | Platt |
| 6,337,699 B1 | 1/2002 | Nielsen |
| 6,342,908 B1 | 1/2002 | Bates et al. |
| 6,351,764 B1 | 2/2002 | Voticky et al. |
| 6,353,398 B1 | 3/2002 | Amin et al. |
| 6,360,101 B1 | 3/2002 | Irvin |
| 6,370,526 B1 | 4/2002 | Agrawal et al. |
| 6,400,810 B1 | 6/2002 | Skladman et al. |
| 6,425,127 B1 | 7/2002 | Bates et al. |
| 6,437,812 B1 | 8/2002 | Giles et al. |
| 6,438,618 B1 | 8/2002 | Lortz et al. |
| 6,442,589 B1 | 8/2002 | Takahashi et al. |
| 6,456,307 B1 | 9/2002 | Bates et al. |
| 6,459,440 B1 | 10/2002 | Monnes et al. |
| 6,459,913 B2 | 10/2002 | Cloutier |
| 6,466,232 B1 * | 10/2002 | Newell et al. ................ 715/700 |
| 6,480,207 B1 | 11/2002 | Bates et al. |
| 6,513,026 B1 | 1/2003 | Horvitz et al. |
| 6,513,046 B1 | 1/2003 | Abbott et al. |
| 6,519,639 B1 | 2/2003 | Glasser et al. |
| 6,542,163 B2 | 4/2003 | Gorbet et al. |
| 6,549,219 B2 | 4/2003 | Selker |
| 6,549,915 B2 | 4/2003 | Abbott, III et al. |
| 6,549,937 B1 | 4/2003 | Auerbach et al. |
| 6,563,514 B1 | 5/2003 | Samar |
| 6,577,329 B1 | 6/2003 | Flickner et al. |
| 6,584,502 B1 | 6/2003 | Natarajan et al. |
| 6,590,587 B1 | 7/2003 | Wichelman et al. |
| 6,591,279 B1 | 7/2003 | Emens et al. |
| 6,593,943 B1 | 7/2003 | MacPhail |
| 6,601,012 B1 | 7/2003 | Horvitz et al. |
| 6,618,716 B1 | 9/2003 | Horvitz |
| 6,622,160 B1 | 9/2003 | Horvitz |
| 6,650,902 B1 | 11/2003 | Richton |
| 6,672,506 B2 | 1/2004 | Swartz et al. |
| 6,714,967 B1 | 3/2004 | Horvitz |
| 6,741,188 B1 | 5/2004 | Miller et al. |
| 6,757,830 B1 | 6/2004 | Tarbotton et al. |
| D494,584 S | 8/2004 | Schlieffers et al. .......... D14/346 |
| 6,791,580 B1 | 9/2004 | Abbott et al. |
| 6,796,505 B2 | 9/2004 | Pellaumail et al. |
| 6,801,223 B1 | 10/2004 | Abbott et al. |
| 6,812,937 B1 | 11/2004 | Abbott et al. |
| 6,829,639 B1 | 12/2004 | Lawson et al. |
| 6,837,436 B2 | 1/2005 | Swartz et al. |
| 6,842,877 B2 | 1/2005 | Robarts et al. |
| 6,965,917 B1 * | 11/2005 | Aloni et al. ................... 709/206 |
| 7,010,501 B1 | 3/2006 | Roslak et al. |
| 7,016,944 B1 | 3/2006 | Meyer et al. |
| 7,040,541 B2 | 5/2006 | Swartz et al. |
| 7,063,263 B2 | 6/2006 | Swartz et al. |
| 7,069,309 B1 | 6/2006 | Dodrill et al. |
| 7,073,129 B1 | 7/2006 | Robarts et al. |
| 7,171,378 B2 | 1/2007 | Petrovich et al. |
| 7,195,157 B2 | 3/2007 | Swartz et al. |
| 7,209,955 B1 | 4/2007 | Major et al. |
| 7,243,130 B2 | 7/2007 | Horvitz et al. |
| 7,249,159 B1 | 7/2007 | Horvitz et al. |
| 7,259,694 B2 | 8/2007 | Myllymaki et al. |
| 7,310,339 B1 | 12/2007 | Powers et al. |
| 7,385,501 B2 | 6/2008 | Miller et al. |
| 7,634,528 B2 | 12/2009 | Horvitz et al. |
| 7,743,340 B2 | 6/2010 | Horvitz et al. |
| 7,844,666 B2 | 11/2010 | Horvitz et al. |
| 2001/0007992 A1 | 7/2001 | Nakaoka |
| 2001/0030664 A1 | 10/2001 | Shulman et al. |
| 2001/0030667 A1 | 10/2001 | Kelts |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2001/0049275 A1 | 12/2001 | Pierry et al. |
| 2001/0055963 A1 * | 12/2001 | Cloutier ....................... 455/417 |
| 2002/0032689 A1 | 3/2002 | Abbott, III et al. |
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054130 A1 | 5/2002 | Abbott et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Roberts et al. |
| 2002/0083158 A1 | 6/2002 | Abbott et al. |
| 2002/0085701 A1 | 7/2002 | Parsons et al. |
| 2002/0087525 A1 | 7/2002 | Abbott et al. |
| 2002/0087649 A1 | 7/2002 | Horvitz |
| 2002/0099817 A1 | 7/2002 | Abbott et al. |
| 2002/0126140 A1 | 9/2002 | Gorbet et al. |
| 2002/0174185 A1 | 11/2002 | Rawat et al. |
| 2002/0174199 A1 | 11/2002 | Horvitz |
| 2003/0023690 A1 | 1/2003 | Lohtia |
| 2003/0023691 A1 | 1/2003 | Knauerhase et al. |
| 2003/0028603 A1 | 2/2003 | Aktas et al. |
| 2003/0046351 A1 | 3/2003 | Maruyama et al. |
| 2003/0046401 A1 | 3/2003 | Abbott et al. |
| 2003/0154476 A1 | 8/2003 | Abbott, III et al. |
| 2003/0182394 A1 | 9/2003 | Ryngler et al. |
| 2004/0030753 A1 | 2/2004 | Horvitz |
| 2004/0061716 A1 | 4/2004 | Cheung et al. |
| 2004/0201500 A1 | 10/2004 | Miller et al. |
| 2004/0225718 A1 | 11/2004 | Heinzel et al. |
| 2005/0034078 A1 | 2/2005 | Abbott et al. |
| 2005/0050143 A1 | 3/2005 | Gusler et al. |
| 2005/0248437 A1 | 11/2005 | Hellebust et al. |

(56) References Cited

U.S. PATENT DOCUMENTS

| | | |
|---|---|---|
| 2005/0266858 A1 | 12/2005 | Miller et al. |
| 2005/0272442 A1 | 12/2005 | Miller et al. |
| 2006/0019676 A1 | 1/2006 | Miller et al. |
| 2008/0090591 A1 | 4/2008 | Miller et al. |
| 2008/0091537 A1 | 4/2008 | Miller et al. |
| 2008/0161018 A1 | 7/2008 | Miller et al. |
| 2009/0299934 A1 | 12/2009 | Horvitz et al. |

FOREIGN PATENT DOCUMENTS

| | | |
|---|---|---|
| EP | 8314827 | 11/1996 |
| EP | 0867823 | 9/1998 |
| EP | 0905633 | 3/1999 |
| GB | 2328110 | 2/1999 |
| JP | 2004-043751 | 2/1992 |
| JP | 2004-082347 | 3/1992 |
| JP | 2005-137057 | 6/1993 |
| JP | 2006-046161 | 2/1994 |
| JP | 2006-168086 | 6/1994 |
| JP | 2006-168281 | 6/1994 |
| JP | 2006-230918 | 8/1994 |
| JP | 2007-143164 | 6/1995 |
| JP | 2008-298544 | 11/1996 |
| JP | 2009-101990 | 4/1997 |
| JP | 2009-212505 | 8/1997 |
| JP | 2009-269940 | 10/1997 |
| JP | 2010-013461 | 1/1998 |
| JP | 2010-003375 | 6/1998 |
| JP | 1079756 | 8/1998 |
| JP | 10079756 | 8/1998 |
| JP | 2011-146010 | 5/1999 |
| JP | 2011-205465 | 7/1999 |
| JP | 2011-249979 | 9/1999 |
| JP | 2011-316635 | 11/1999 |
| JP | 2011-316762 | 11/1999 |
| JP | 11316762 | 11/1999 |
| JP | 2011-341049 | 12/1999 |
| JP | 2000-040000 | 2/2000 |
| JP | 2000-112846 | 4/2000 |
| JP | 2001-092755 | 4/2001 |
| JP | 2001-117894 | 4/2001 |
| JP | 2001-119749 | 4/2001 |
| JP | 2001-147872 | 5/2001 |
| JP | 2001-189749 | 7/2001 |
| JP | 2001-237874 | 8/2001 |
| JP | 2001-331422 | 11/2001 |
| JP | 2002-014923 | 1/2002 |
| JP | 2002-041431 | 2/2002 |
| JP | 2002-041433 | 2/2002 |
| JP | 2002-183021 | 6/2002 |
| JP | 2002-236654 | 8/2002 |
| JP | 2002-236655 | 8/2002 |
| JP | 2003-504751 | 2/2003 |
| JP | 2003-101588 | 4/2003 |
| JP | 2003-125366 | 4/2003 |
| JP | 2003-141050 | 5/2003 |
| JP | 2003-271531 | 9/2003 |
| JP | 2003-527656 | 9/2003 |
| JP | 2004-062451 | 2/2004 |
| JP | 2004-506961 | 3/2004 |
| JP | 2004-140432 | 5/2004 |
| JP | 2007-536600 | 12/2007 |
| KR | 10-1999-0078840 | 5/1999 |
| KR | 10-2000-0014713 | 3/2000 |
| KR | 10-2003-0003407 | 1/2003 |
| WO | WO96/35994 | 11/1996 |
| WO | WO97/38382 | 10/1997 |
| WO | WO98/00787 | 1/1998 |
| WO | WO98/37680 | 8/1998 |
| WO | WO98/47268 | 10/1998 |
| WO | WO98/58321 | 12/1998 |
| WO | WO99/06915 | 2/1999 |
| WO | WO99/34628 | 7/1999 |
| WO | WO99/41720 | 8/1999 |
| WO | WO99/67731 | 12/1999 |
| WO | WO00/36493 | 6/2000 |
| WO | WO00/49776 | 8/2000 |
| WO | WO01/04723 | 1/2001 |
| WO | WO01/09755 | 2/2001 |
| WO | WO01/13576 | 2/2001 |
| WO | WO01/69387 | 9/2001 |
| WO | WO01/69432 | 9/2001 |
| WO | WO01/84764 | 11/2001 |
| WO | WO02/39761 | 5/2002 |
| WO | WO02/065250 | 8/2002 |
| WO | WO03/048914 | 6/2003 |
| WO | WO03/048960 | 6/2003 |
| WO | WO2004/025912 | 3/2004 |
| WO | WO2005/006130 | 1/2005 |

OTHER PUBLICATIONS

Advisory Action filed Jan. 23, 2007, in U.S. Appl. No. 10/220,550 (3 pages).
Advisory Action mailed Apr. 25, 2008, in U.S. Appl. No. 10/021,621 (4 pages).
Advisory Action mailed Jun. 21, 2006, in U.S. Appl. No. 09/595,401 (3 pages).
Advisory Action mailed Nov. 3, 2003, in U.S. Appl. No. 09/595,401 (3 pages).
Advisory Action mailed Nov. 30, 2005, in U.S. Appl. No. 10/021,621 (3 pages).
Advisory Action mailed Nov. 30, 2005, in U.S. Appl. No. 10/220,550 (4 pages).
Advisory Action mailed Oct. 14, 2008, in U.S. Appl. No. 09/882,857 (3 pages).
Advisory Action mailed on Aug. 29, 2007, in U.S. Appl. No. 10/609,818 (3 pages).
Advisory Action mailed on Sep. 12, 2008, in U.S. Appl. No. 10/609,818 (3 pages)—Resubmission to correct date error.
Advisory Action mailed on Sep. 12, 2009, in U.S. Appl. No. 10/609,818 (4 pages).
Amendment After Notice of Allowance mailed Apr. 16, 2010, filed on Mar. 17, 2010, in U.S. Appl. No. 10/610,487 (11 pages).
Appeal Brief filed Apr. 23, 2007, in U.S. Appl. No. 10/220,550 (23 pages).
Appeal Brief filed Aug. 21, 2008, in U.S. Appl. No. 10/021,621 (48 pages).
Appeal Brief filed dated Oct. 2, 2008, in U.S. Appl. No. 10/021,621 (3 pages).
Appeal Brief filed Dec. 24, 2008, in U.S. Appl. No. 09/882,857 (17 pages).
Appeal Brief filed Feb. 6, 2004, in U.S. Appl. No. 09/595,401 (19 pages).
Appeal Brief filed Jan. 22, 2009, in U.S. Appl. No. 10/021,621 (3 pages).
Appeal Brief filed Jan. 26, 2006, in U.S. Appl. No. 10/021,621 (25 pages).
Appeal Brief filed Jun. 29, 2009, in U.S. Appl. No. 10/021,621 (5 pages).
Appeal Brief filed Mar. 8, 2005, in U.S. Appl. No. 09/882,857 (20 pages).
Appeal Brief filed Nov. 8, 2005, in U.S. Appl. No. 09/881,502 (9 pages).
Appeal Brief filed Oct. 27, 2009, in U.S. Appl. No. 10/021,621 (49 pages).
Appeal Brief filed on Dec. 10, 2008, in U.S. Appl. No. 10/609,818 (44 pages).
Appeal Brief filed Sep. 18, 2006, in U.S. Appl. No. 09/595,401 (22 pages).
Australian Notice of Allowance mailed May 26, 2010, in Australian Patent Application No. 2005202775 (3 pages).
Australian Office Action dated Dec. 21, 2009, in Australian Patent Application No. 2005202775 (2 pages).
Australian Office Action dated May 3, 2010, in Australian Patent Application No. 2005202775 (53 pages).
Baclace, Paul E. Competitive Agents for Information Filtering, Dec. 1999, 1 page.

(56) References Cited

OTHER PUBLICATIONS

Billinghurst, M. et al., An Evaluation of Wearable Information Spaces, Proceedings of the Virtual Reality Annual International Symposium, 1998, 8 pages.
Billinghurst, Mark et al., Wearable Devices: New Ways to Manage Information. IEEE Computer Society, Jan. 1999, pp. 57-64.
Billinghurst, Mark Research Directions in Wearable Computing, University of Washington, May 1998,48 pages.
Birnbaum, Larry, et al. Compelling Intelligent User Interfaces—How Much AI?, IUI, Orlando Florida, 1997, ACM 0-89791-839-8/91/01, pp. 173-175.
Boone, Gary Concept Features in Re: Agent, an Intelligent Email Agent, 1998, 8 pages.
BPAI Decision—Examiner Affirmed in Part mailed Aug. 10, 2005, in U.S. Appl. No. 09/595,401 (10 pages).
BPAI Decision—Examiner Affirmed mailed Feb. 12, 2008, in U.S. Appl. No. 09/595,401 (11 pages).
BPAI Decision—Examiner Affirmed mailed Mar. 14, 2007, in U.S. Appl. No. 10/021,621 (13 pages).
BPAI Decision—Examiner Affirmed mailed Mar. 7, 2007, in U.S. Appl. No. 09/881,502 (6 pages).
Breese, et al. Empirical analysis of predictive algorithms for collaborative filtering, in proceedings of the 14th conf on uncertainty in A1, 1998, pp. 43-52, AUAI, Morgan Kaufmann, San Francisco.
Cameron, Alec, et al., Identifying and Localizing Electrical Components: A Case Study of Adaptive Goal-directed Sensing, 1997, 6 pages.
Canadian Office Action mailed Jun. 6, 2012, in Application No. 2511102 (5 pages).
Chang, Yu Lo Cyrus et al., Bayesian Analysis for Fault Location in Homogeneous Distributed Systems, 1993, 10 pages.
Chen, Chaomei Visualizing Semantic Spaces and Author Co-citation Networks in Digital Libraries, 1999, 13 pages.
China Decision on Rejection mailed Oct. 14, 2010, in Chinese Application No. 200410079763.6 (13 pages).
China Notice on Grant of Patent Right for Invention, in Chinese Application No. 200410079772 5, mailed Oct. 13, 2010 (4 pages).
China Notice on Grant of Patent Right for Invention, mailed Aug. 25, 2011 in Chinese Patent Application No. 200410079763.6 (4 pgs.).
China Response to Fourth Office Action mailed Feb. 5, 2010, in Chinese Application No. 200410079763.6, filed Apr. 19, 2010 (15 pages).
China Response to Second Office Action mailed Mar. 13, 2009, in Chinese Application No. 200410079763.6, filed Jul. 28, 2009 (13 pages).
China Response to Second Office Action mailed Mar. 13, 2009, in Chinese Application No. 200410079772.5, filed Jul. 28, 2009 (13 pages).
China Response to Third Office Action mailed Oct. 16, 2009, in Chinese Application No. 200410079763.6, filed Dec. 28, 2009 (10 pages).
Chinese Decision on Rejection mailed Mar. 23, 2011, in Chinese Application no. 200480015643.8.
Chinese First Office Action mailed Apr. 14, 2010, in People's Republic of China Patent Application No. 200410063950.5 (14 pages).
Chinese First Office Action mailed Aug. 15, 2008, in People's Republic of China Patent Application No. 200510081863.7 (11 pages).
Chinese First Office Action mailed Dec. 10, 2004, in People's Republic of China Patent Application No. 01809514.3 (11 pages).
Chinese First Office Action mailed Jul. 4, 2008, in People's Republic of China Patent Application No. 200480015643.8 (23 pages).
Chinese First Office Action mailed Jul. 6, 2007, in People's Republic of China Patent Application No. 200410079768.9 (11 pages).
Chinese First Office Action mailed Jun. 15, 2007, in People's Republic of China Patent Application No. 200410043017.1 (16 pages).
Chinese First Office Action mailed Jun. 29, 2007, in People's Republic of China Patent Application No. 200410079772.5 (10 pages).
Chinese Fourth Office Action mailed Feb. 5, 2010, in People's Republic of China Patent Application No. 200410079763.6 (15 pages).
Chinese Notice on Grant of Patent Right for Invention mailed Aug. 1, 2008, in People's Republic of China Patent Application 200410043017.1 (4 pages).
Chinese Notice on Grant of Patent Right for Invention mailed Dec. 2, 2011, in Application No. 200410063950.5, 4 pgs.
Chinese Notice on Grant of Patent Right for Invention mailed Dec. 4, 2009, in People's Republic of China Patent Application 200410079768.9 (4 pages).
Chinese Notice on Grant of Patent Right for Invention mailed Mar. 6, 2009, in People's Republic of China Patent Application 200510081863.7 (4 pages).
Chinese Notice on Grant of Patent Right for Invention mailed Oct. 30, 2009, in People's Republic of China Patent Application 01809514.3 (4 pages).
Chinese Office Action mailed Jul. 6, 2007, in People's Republic of China Patent Application No. 200410079763.6 (6 pages).
Chinese Reexamination Request filed Jan. 7, 2011, in Chinese Application No. 200410079763.6.
Chinese Reexamination Request filed Jan. 7, 2011, in Chinese Application No. 200480015643.8.
Chinese Response to First Office Action mailed Apr. 14, 2010, in People's Republic of China Patent Application No. 200410063950.5, filed May 28, 2010 (21 pages).
Chinese Response to First Office Action mailed Aug. 15, 2008, in People's Republic of China Patent Application No. 200510081863.7, filed Dec. 29, 2008 (21 pages).
Chinese Response to First Office Action mailed Dec. 10, 2004, in People's Republic of China Patent Application No. 01809514.3, Apr. 21, 2005 (9 pages).
Chinese Response to First Office Action mailed Jul. 4, 2008, in People's Republic of China Patent Application No. 200480015643.8, filed Nov. 4, 2008 (24 pages).
Chinese Response to Office Action mailed Jul. 6, 2007, in People's Republic of China Patent Application No. 200410079768.9, filed Nov. 19, 2007 (8 pages).
Chinese Response to Second Office Action mailed Jun. 5, 2009, in People's Republic of China Patent Application No. 200480015643.8, filed Aug. 5, 2009 (21 pages).
Chinese Response to Second Office Action mailed Mar. 20 2009, in People's Republic of China Patent Application No. 200410079768.9, Jul. 17, 2009 (24 pages).
Chinese Response to Second Office Action mailed May 9, 2008, in People's Republic of China Patent Application No. 0109514.3, Jul. 8, 2008 (10 pages).
Chinese Response to Third Office Action mailed Aug. 28, 2009, in People's Republic of China Patent Application No. 200410079768.9, Oct. 30, 2009 (18 pages).
Chinese Response to Third Office Action mailed Dec. 25, 2009, in People's Republic of China Patent Application No. 200480015643.8, filed Feb. 25, 2010 (20 pages).
Chinese Response to Third Office Action mailed Jan. 23, 2009, in People's Republic of China Patent Application No. 01809514.3, Mar. 19, 2009 (4 pages).
Chinese Second Office Action mailed Jun. 5, 2009, in People's Republic of China Patent Application No. 200480015643.8 (14 pages).
Chinese Second Office Action mailed Mar. 13, 2009, in People's Republic of China Patent Application No. 200410079763.6 (9 pages).
Chinese Second Office Action mailed Mar. 13, 2009, in People's Republic of China Patent Application No. 200410079772.5 (12 pages).
Chinese Second Office Action mailed Mar. 20 2009, in People's Republic of China Patent Application No. 200410079768.9 (10 pages).
Chinese Second Office Action mailed May 9, 2008, in People's Republic of China Patent Application No. 0108514.3 (13 pages).
Chinese Third Office Action mailed Aug. 28, 2009, in People's Republic of China Patent Application No. 200410079768.9 (8 pages).
Chinese Third Office Action mailed Dec. 25, 2009, in People's Republic of China Patent Application No. 200480015643.8 (18 pages).

(56) References Cited

OTHER PUBLICATIONS

Chinese Third Office Action mailed Feb. 5, 2010, in People's Republic of China Patent Application No. 200410079772.5 (13 pages).
Chinese Third Office Action mailed Jan. 23, 2009, in People's Republic of China Patent Application No. 01809514.3 (7 pages).
Chinese Third Office Action mailed Oct. 16, 2009, in People's Republic of China Patent Application No. 200410079763.6 (13 pages).
Chu, Francis et al., A Decision-Theoretic Approach to Reliable Message Delivery,1998, 16 pages.
Cohen, William W. Learning Rules that Classify E-Mail, 1996, 9 pages.
Communication from the Examination Division mailed Jan. 3, 2008, in European Patent Office Application No. 07 013 320.2 (5 pages).
Communication from the Examination Division mailed Jul. 14, 2006, in European Patent Office Application No. 04 000 621.5 (10 pages).
Communication from the Examination Division mailed Mar. 27, 2006, in European Patent Office Application No. 04 102 332.6 (4 pages).
Communication from the Examination Division mailed Nov. 12, 2009, in European Patent Office Application No. 05 105 299.1 (8 pages).
Communication from the Examination Division mailed Nov. 15, 2006, in European Patent Office Application No. 04 102 332.6 (9 pages).
Communication from the Examination Division mailed Nov. 6, 2006, in European Patent Office Application No. 05 105 299.1 (6 pages).
Communication from the Examination Division mailed Sep. 11, 2008, in European Patent Office Application No. 07 013 320.2 (3 pages).
Communication from the Examination Division mailed Sep. 13, 2007, in European Patent Office Application No. 04 755 824.2 (8 pages).
Communication from the Examining Division mailed Apr. 19, 2006, in European Patent Application No. 02 025 530.3 (4 pages).
Communication from the Examining Division mailed dated Sep. 5, 2005, in European Patent Application No. 01 920 508.7 (5 pages).
Communication from the Examining Division mailed Jun. 23, 2010, in European Patent Application No. 01 922 463.3 (4 pages).
Communication from the Examining Division mailed May 30, 2003, in European Patent Application No. 01 920 508.7 (4 pages).
Communication from the Examining Division mailed Sep. 24, 2007, in European Patent Application No. 01 922 463.3 (4 pages).
Communication regarding the Transmission of the European Search Report mailed Jun. 30, 2005, in European Patent Application No. 02 025 530.3 (9 pages).
Communication regarding the Transmission of the European Search Report mailed Mar. 31, 2005, in European Patent Application No. 02 025 530.3 (4 pages).
Oral Proceedings mailed Apr. 2, 2009, in European Patent Office Application No. 04 000 621.5 (43 pages).
Czerwinski, M. et al. Visualizing implicit queries for information management and retrieval, in proceedings of CHI'99, ACM SIGCHI Conf on informational and knowledge management, 1999, pp. 560-567, ACM.
Dantzich, M. Van, et al. Scope: Providing Awareness of Multiple Notifications at a Glance. In Proceedings of AVI 2002, ACM Conference on Advanced Visual Interfaces, 2002. 11 pages.
Decision on Appeal mailed Jan. 20, 2011, in U.S. Appl. No. 10/220,550 (17 pages).
Decision to Grant a European Patent mailed Oct. 16, 2008, in European Patent Office Application No. 04 102 332.6 (2 pages).
Decision to Refuse a European Application mailed Dec. 7, 2009, in European Application No. 04 755 824.2 (24 pgs.).
Dumais, S. et al. Inductive learning algorithms and representations for text categorization, in proceedings of 7th Intl Conf on Information and Knowledge Management, 1998, pp. 148-155, ACM.
European Decision to Grant mailed dated Jun. 21, 2007, in European Patent Application No. 01 920 508.7 (2 pages).
European Minutes and Decision of the Oral Proceedings mailed Dec. 7, 2009, in European Patent Application No. 047558241 (22 pages).
European Response to Communication from the Examination Division mailed Nov. 12, 2009, in European Patent Office Application No. 05 105 299.1, filed Mar. 4, 2010 (20 pages).
European Response to Communication from the Examining Division mailed Jun. 23, 2010, in European Patent Application No. 01 922 463.3, filed Nov. 3, 2010 (20 pages).
European Search Report dated Sep. 28, 2005 for Application No. EP 05 10 5299, 4 pages.
European Search Report dated Jun. 15, 2005, European Application No. 02 025 530 (9 pages).
European Search Report dated Mar. 11, 2005, European Application No. 04 102 332 (6 pages).
European Search Report dated Mar. 17, 2005, European Application No. 02 025 530 (4 pages).
European Search Report dated Sep. 21, 2005, European Application No. 05 105 299 (4 pages).
European Search Report mailed Jul. 5, 2004, in European Application No. EP 04000621.
European Statement of Ground of Appeal filed Apr. 9, 2010, in European Patent Application No. 04755824.2 (34 pages).
Examiner's Answer to Appeal Brief (Dec. 24, 2008), mailed Apr. 16, 2009, in U.S. Appl. No. 09/882,857 (14 pages).
Examiner's Answer to Appeal brief (Feb. 6, 2004), mailed Mar. 11, 2004, in U.S. Appl. No. 09/595,401 (13 pages).
Examiner's Answer to Appeal Brief (Jan. 26, 2006), filed Apr. 20, 2006, in U.S. Appl. No. 10/021,621 (39 pages).
Examiner's Answer to Appeal Brief (Nov. 8, 2005), mailed Jan. 27, 2006, in U.S. Appl. No. 09/881,502 (9 pages).
Examiner's Answer to Appeal Brief (Sep. 18, 2006), mailed Dec. 13, 2006, in U.S. Appl. No. 09/595,401 (16 pages).
Examiner's Answer to Appeal Brief (Sep. 18, 2006), mailed Nov. 3, 2006, in U.S. Appl. No. 09/595,401 (16 pages).
Examiner's Answer to Appeal Brief mailed Apr. 2, 2008, in U.S. Appl. No. 10/220,550 (28 pages).
Examiner's Answer to Appeal Brief mailed Mar. 18, 2008, in U.S. Appl. No. 10/220,550 (28 pages).
Final Office Action mailed Apr. 13, 2010, in U.S. Appl. No. 09/881,502 (14 pages).
Final Office Action mailed Apr. 18, 2006, in U.S. Appl. No. 09/595,401 (16 pages).
Final Office Action mailed Aug. 31, 2007, in U.S. Appl. No. 09/882,857 (10 pages).
Final Office Action mailed Feb. 4, 2008, in U.S. Appl. No. 10/021,621 (39 pages).
Final Office Action mailed Jan. 14, 2004, in U.S. Appl. No. 09/596,365 (12 pages).
Final Office Action mailed Jul. 22, 2008, in U.S. Appl. No. 09/882,857 (13 pages).
Final Office Action mailed Jul. 25, 2003, in U.S Appl. No. 09/595,401 (11 pages).
Final Office Action mailed Jun. 3, 2005, in U.S. Appl. No. 09/881,502 (8 pages).
Final Office Action mailed Mar. 22, 2007, in U.S. Appl. No. 09/882,857 (9 pages).
Final Office Action mailed Nov. 2, 2005, in U.S. Appl. No. 09/882,857 (15 pages).
Final Office Action mailed Oct. 21, 2004, in U.S. Appl. No. 09/882,857 (26 pages).
Final Office Action mailed Oct. 4, 2006, in U.S. Appl. No. 10/220,550 (27 pages).
Final Office Action mailed Oct. 4, 2007, in U.S. Appl. No. 10/611,491 (21 pages).
Final Office Action mailed on Jan. 14, 2010, in U.S. Appl. No. 11/749,508 (15 pages).
Final Office Action mailed on Jul. 22, 2008, in U.S. Appl. No. 10/609,818 (14 pages).
Final Office Action mailed on Jul. 24, 2007, in U.S. Appl. No. 10/609,818 (24 pages).
Final Office Action mailed on Mar. 18, 2009, in U.S. Appl. No. 10/610,487 (27 pages).

(56) References Cited

OTHER PUBLICATIONS

Final Office Action mailed on Oct. 29, 2010, in U.S. Appl. No. 11/749,508 (10 pages).
Final Office Action mailed Sep. 20, 2005, in U.S. Appl. No. 10/021,621 (36 pages).
Final Office Action mailed Sep. 22, 2005, in U.S. Appl. No. 10/220,550 (23 pages).
Final Office Action mailed Sep. 25, 2006, in U.S. Appl. No. 09/882,857 (9 pages).
Final Office Action, mailed Apr. 30, 2009, in U.S. Appl. No. 09/881,502 (11 pages).
Final Rejection mailed Apr. 29, 2009, in U.S. Appl. No. 10/882,009 (12 pgs).
Graham-Cumming et al. "Project of the Month, May 2003: POPFile" Sourceforge.net, May 2003: <http://sourceforge.net/potm-2003-05.php> (6 pages).
Guanling, Chen et al., A Survey of Context-Aware Mobile Computing Research, Dartmouth Computer Science Technical Report, 2000, 16 pages.
Haddawy, Peter An Overview of Some Recent Developments in Bayesian Problem-Solving Techniques Introduction to This Special Issue, 1999, 14 pages.
Harter, Andy et al., A Distributed Location System for the Active Office. IEEE Network, 1994, pp. 62-70.
Hearst, Marti A. et al., Machine Learning in Information Access Papers from the 1996 AAA! Spring Symposium, 1996, 4 pages.
Helfman, Jonathan Isaac, et al., Ishmail: Immediate Identification of Important Information, 1995, 9 pages.
Honma, Kenji et al., " Lecture about Wielding Mail in Mobile Phone or PHS," Nikkei Personal Computer, No. 350, pp. 234-249, Nikkei BP, Nov. 29, 1999 (18 pgs.).
Horvitz, E. et al. The Lumiere project: Bayesian user modeling for inferring the goals and needs of software users, in proceedings of the 14th conf on uncertainty in A1, 1998, pp. 256-265, Morgan Kaufmann, San Francisco.
Horvitz, Eric et al., Attention-Sensitive Alerting in Computing Systems, Microsoft Research, Aug. 1999.
Horvitz, Eric et al., In Pursuit of Effective Handsfree Decision Support: Coupling Bayesian Inference, Speech Understanding, and User Models, 1995, 8 pages.
Horvitz, Eric et al., Models of Attention in Computing and Communication: From Principles to Applications, Communications of the ACM 46(3): 52-29, Mar. 2003.
Horvitz, et al. Display of Information for time-critical decision making, in Proceedings of the 11th Conf on uncertainty in A1, 1995, pp. 296-305, Montreal, Canada.
Horvitz, Principles of mixed-initiative user interfaces, in proceedings of CHI'99, ACM SIGCHI Conf on Human Factors in Computing Systems, 1999, pp. 159-166, Pittsburgh, PA, ACM.
Horvitz, Time dependent utility and action under uncertainty, in proceedings of 7th conf on uncertainty in A1, LA, CA, 1991, pp. 151-158, Morgan Kaufmann, San Francisco.
Horvitz, Time-critical action: representations and application, in proceedings of the 13th conf on uncertainty in A1 (UAI-97), 1997, pp. 250-257, Providence, RI, Morgan Kaufmann, San Francisco.
India Examination Report mailed Mar. 24, 2009, in India Patent Application No. 5292DELNP2005 (1 page).
India First Examination Report mailed Apr. 4, 2008, in India Patent Application No. 5292/DELN/P2005 (1 page).
India First Examination Report mailed Mar. 22, 2011, in India Patent Application No. 32/MUM/2004 (2 pages).
India Hearing Notice mailed Aug. 16, 2012, in India Patent Application No. 32/MUM/2004 (13 pgs).
International Search Report dated Aug. 20, 2002, for International Application Serial No. PCT/US01/08711 (12 pgs).
International Search Report dated Jun. 28, 2006 for International Patent Application Serial No. PCT/US04/19915, 4 pages
International Search Report dated Jun. 28, 2006, Application No. PCT/US04/19915 (2 pages).
International Search Report dated Sep. 2, 2002, for International Application Serial No. PCT/US01/08710 (7 pgs).
International Search Report dated Sep. 29, 2003 for PCT Application Serial No. 00/20685, 3 Pages.
InterOp Magazine, 1999, Japanese Application No. JP 2002-331278, rejection mailed Jun. 27, 2008, (English translation not available) (6 pages).
Japanese Appeal Decision mailed Dec. 13, 2011, in Patent Application No. 2002-331278, 4 pgs.
Japanese Decision to Decline the Amendment mailed Jun. 8, 2012, in Patent Application No. 2005188308, 5 pgs.
Japanese Final Office Action mailed Oct. 21, 2008, in Japanese Patent Application No. 2002331278 (6 pages).
Japanese Final Rejection mailed on Dec. 28, 2010, in Japanese Patent Application No. 2001567443 (4 pages).
Japanese Final Rejection mailed on Jun. 8, 2012, in Patent Application No. 2005-188308, 4 pgs.
Japanese Interrogation mailed on Dec. 17, 2010, in Japanese Patent Application No. 2002331278 (8 pages).
Japanese Interrogation mailed on Dec. 20, 2010, in Patent Application No. 2001-567443, 7 pgs.
Japanese Notice of Allowance mailed Feb. 26, 2010, in Japanese Patent Application No. 2004020451 (6 pages).
Japanese Notice of Allowance mailed May 11, 2012, in Application No. 2010-135289, 6 pgs.
Japanese Notice of Allowance mailed May 11, 2012, in Application No. 2010-135290, 6 pgs.
Japanese Notice of Allowance mailed Oct. 8, 2010, in Japanese Patent Application No. 2004156807 (6 pages).
Japanese Notice of Rejection mailed Nov. 30, 2010, in Japanese Patent Application No. 2006-517518 (6 pages).
Japanese Notice of Rejection mailed Oct. 25, 2011, in Application No. 2010-135290, 5 pgs.
Japanese Notice of Rejection mailed on Jan. 18, 2011, in Japanese Patent Application No. 2005-188308 (8 pages).
Japanese Notice of Rejection mailed on Oct. 25, 2011, in Application No. 2010-135289, 7 pgs.
Japanese Notice of Rejection mailed on Sep. 7, 2010, in Japanese Patent Application No. 2001567443 (9 pages).
Japanese Notice of Rejection mailed Apr. 16, 2010, in Japanese Patent Application No. 2004-156807 (13 pages).
Japanese Office Action mailed Aug. 7, 2009, in Japanese Patent Application No. 2004-020451 (4 pages).
Japanese Office Action mailed Feb. 12, 2010, in Japanese Patent Application No. 2006-517518 (4 pages).
Japanese Office Action mailed Jun. 27, 2008, in Japanese Patent Application No. 2002-331278 (6 pages).
Japanese Patent Office Notice of Rejection mailed on Aug. 12, 2011, in Japanese Patent Application No. 2002331278 (13 pgs.).
Japanese Patent Office Notice of Rejection mailed on Sep. 16, 2011, in Japanese Patent Application No. 2005-188308 (12 pgs.).
Japanese Response filed Apr. 18, 2011 in Japanese Application No. 2005-188308.
Japanese Response to Final Office Action mailed Oct. 21, 2008, in Japanese Patent Application No. 2002331278, filed Feb. 18, 2009 (11 pages).
Japanese Response to Notice of Rejection mailed on Sep. 7, 2010, in Japanese Patent Application No. 2001567443, filed Dec. 7, 2010 (20 pages).
Japanese Response to Office Action mailed Apr. 16, 2010, in Japanese Patent Application No. 2004156807, filed Jul. 16, 2010 (17 pgs).
Japanese Response to Office Action mailed Jun. 27, 2008, in Japanese Patent Application No. 2002-331278, filed Sep. 29, 2008 (11 pgs).
Japanese Response to Office Action mailed Nov. 30, 2010, in Japanese Patent Application No. 2006-517518, filed Feb. 28, 2011 (11 pgs).
Jeftovic, Mark. "SpamAssassin Prehistory: filter.plx," Feb. 1998. Version 1.02d. Description from the Apache Software Foundation (<http://spamassassin.apache.org/prehistory/>) accessed Feb. 15, 2007 (1 page).
Jensen, Finn V. Bayesian Networks Basics, Winter 1995/Spring 1996, 12 pages.

(56) References Cited

OTHER PUBLICATIONS

Joachims, T. Text Categorization with Support Vector Machines: Learning with Many Relevant Features. Machine Learning, European Conference on Machine Learning, Apr. 21, 1998, pp. 137-142.
Kalakota, Ravi, et al., Mobile Agents and Mobile Workers, Proceedings of the 29th Annual Hawaii International Conference on System Sciences, 1996, pp. 354-365.
Koller, D. et al. Toward optimal feature selection, in proceedings of 13th conference on machine learning, 1998, pp. 284-292, Morgan Kaufmann, San Francisco.
Korean Amendment filed Aug. 29, 2011, in Korean Patent Application No. Oct. 2005-0053862 (33 pgs.).
Korean Appeal Brief filed Aug. 14, 2009, in Korean Patent Application No. 10-2008-7012535 (40 pages).
Korean Appeal Brief filed in Response to Final Office Action mailed Nov. 13, 2009, in Korean Patent Application No. 10-2002-70695, filed Dec. 14, 2009 (7 pgs).
Korean Final Office Action mailed Mar. 25, 2008, in Korean Patent Application No. 10-2002-7010701 (4 pages).
Korean Final Office Action mailed Nov. 13, 2009, in Korean Patent Application No. 10-2002-70695 (7 pages).
Korean Final Office Action mailed Sep. 15, 2009, in Korean Patent Application No. 10-2008-7012535 (6 pages).
Korean Office Action dated Feb. 27, 2008, in Korean Patent Application No. 10-2002-7010700 (11 pages).
Korean Office Action mailed Apr. 7, 2009, in Korean Patent Application No. 10-2008-7012535 (6 pages).
Korean Office Action mailed Aug. 3, 2007, in Korean Patent Application No. 10-2002-7010701 (9 pages).
Korean Office Action mailed Jul. 18, 2007, in Korean Patent Application No. 10-2002-7010700 (6 pages).
Korean Office Action mailed Mar. 30, 2009, in Korean Patent Application No. 10-2002-7010700 (4 pages).
Korean Office Action mailed May 28, 2009, in Korean Patent Application No. 10-2002-70695 (15 pages).
Korean Office Action mailed May 29, 2008, in Korean Patent Application No. 10-2002-7010701 (3 pages).
Korean Office Action mailed Oct. 1, 2009, in Korean Patent Application No. 10-2009-7015992 (2 pages) [English translation only].
Korean Office Action mailed Sep. 24, 2008, in Korean Patent Application No. 10-2008-7012535 (7 pages).
Korean Response filed Apr. 8, 2011 in Korean Application No. 10-2005-7021374.
Korean Response to Office Action mailed Jan. 10, 2011, in Korean Patent Application No. 10-2004-38693, filed Mar. 10, 2011 (20 pgs).
Korean Response to Office Action mailed Mar. 9, 2010, in Korean Patent Application No. 10-2010-725, filed May 7, 2010 (12 pgs).
Korean Response to Office Action mailed Oct. 1, 2010, in Korean Patent Application No. 10-2009-7015992, filed Feb. 1, 2011 (33 pgs).
Korean Response to Office Action mailed Sep. 30, 2010, in Korean Patent Application No. 10-2004-05500, filed Nov. 30, 2010 (36 pgs).
Lashkari, Yezdi, et al., Collaborative Interface Agents, in Conference of the American Association for Artificial Intelligence. Seattle, WA, 1994 (6 pgs).
Leiberman, H. Letizia: An Agent that assists web browsing, in proceedings of IJCAI-95, 1995, 6 pages, Montreal Canada, Morgan Kaufmann, San Francisco.
Liu, Chien-Liang, et al. The Design of Anti-SPAM Knowledge-Based system. Apricot 2003 Conference. Online. http://scholar.google.com/scholar?hl=en&lr=& q=spam+filter+%22White+list%22&btnG=Search, retrieved on Feb. 9, 2005. Feb. 2003 (23 pages).
Loke, Seng Wai, et al., Location-Based Personal Agents: A Metaphor for Situated Computing, 2000 IEEE, pp. 17-19.
Losee Jr., Robert M. Minimizing Information Overload: the Ranking of Electronic Messages, 1989, 11 pages.
Macskassy, Sofus a. et al., Email Valet: Learning Email Preferences for Wireless Platforms, Rutgers University, User Modeling 1999 Workshop—Machine Learning for User Modeling, Jun. 3, 1999, 4 pages.
Makoto, Iwayama et al., Hierarchical Bayesian Clustering for Automatic Text Classification, 1995, 6 pages.
Marx, M. et al., Clues: Dynamic Personalized Message Filtering, Proceedings of the ACM 1996 Conference on Computer Supported Cooperative Work, Boston, Nov. 16-20, 1996, pp. 113-121.
Masami Ujiie, "A Study of Human Interface of Electronic Mail System with Screening Functions," Journal of Information Processing Society of Japan, vol. 90, No. 52, 31-2, pp. 1-10, Report of Study Meeting on Human Interface, No. 31, Information Processing Society of Japan, Japan, Jul. 5, 1990.
Mccrickard, D. Scott and C.M. Chewar. Attuning Notification Design to User Goals and Attention Costs. Communications of the ACM, vol. 46 Issue 3, pp. 67-72, 2003.
Noh, Sanguk et al., Rational Communicative Behavior in Anti-Air Defense, 1998, 9 pages.
Non-Final Action mailed Sep. 26, 2005, in U.S Appl. No. 09/596,365 (6 pages).
Non-Final Office Action mailed Apr. 10, 2007, in U.S. Appl. No. 10/611,491 (18 pages).
Non-Final Office Action mailed Apr. 4, 2006, in U.S. Appl. No. 09/882,857 (16 pages).
Non-Final Office Action mailed Aug. 24, 2007, in U.S. Appl. No. 10/021,621 (39 pages).
Non-Final Office Action mailed Aug. 7, 2006, in U.S. Appl. No. 09/596,365 (7 pages).
Non-Final Office Action mailed Dec. 2, 2004, in U.S. Appl. No. 09/881,502 (8 pages).
Non-Final Office Action mailed Dec. 28, 2005, in U.S. Appl. No. 09/595,401 (11 pages).
Non-Final Office Action mailed Feb. 21, 2008, in U.S. Appl. No. 11/737,247 (16 pages).
Non-Final Office Action mailed Feb. 22, 2008, in U.S. Appl. No. 10/610,487 (27 pages).
Non-Final Office Action mailed Jan. 14, 2008, in U.S. Appl. No. 10/611,491 (19 pages).
Non-Final Office Action mailed Jan. 2, 2004, in U.S. Appl. No. 09/882,857 (22 pages).
Non-Final Office Action mailed Jan. 21, 2010, in U.S. Appl. No. 10/021,621 (41 pages).
Non-Final Office Action mailed Jan. 25, 2008, in U.S. Appl. No. 09/882,857 (10 pages).
Non-Final Office Action mailed Jan. 8, 2003, in U.S. Appl. No. 09/595,401 (9 pages).
Non-Final Office Action mailed Jun. 11, 2008, in U.S. Appl. No. 09/595,401 (14 pages).
Non-Final Office Action mailed Jun. 27, 2003, in U.S. Appl. No. 09/596,365 (10 pages).
Non-Final Office Action mailed Mar. 18, 2005, in U.S. Appl. No. 10/220,550 (22 pages).
Non-Final Office Action mailed Mar. 22, 2005, in U.S. Appl. No. 10/021,621 (40 pages).
Non-Final Office Action mailed Mar. 30, 2006, in U.S. Appl. No. 10/220,550 (22 pages).
Non-Final Office Action mailed May 20, 2005, in U.S. Appl. No. 09/882,857 (31 pages).
Non-Final Office Action mailed Oct. 1, 2009, in U.S. Appl. No. 10/610,487 (9 pages).
Non-Final Office Action mailed Oct. 11, 2011, in U.S. Appl. No. 12/259,157 (8 pgs).
Non-Final Office Action mailed Oct. 14, 2009, in U.S. Appl. No. 09/881,502 (10 pages).
Non-Final Office Action mailed Oct. 4, 2006, in U.S. Appl. No. 10/220,419 (16 pages).
Non-Final Office Action mailed on Apr. 1, 2010, in U.S. Appl. No. 11/469,058 (15 pages).
Non-Final Office Action mailed on Feb. 28, 2007, in U.S. Appl. No. 10/609,818 (18 pages).
Non-Final Office Action mailed on Jan. 3, 2008, in U.S. Appl. No. 10/609,818 (15 pages).
Non-Final Office Action mailed on Jan. 7, 2011, in U.S. Appl. No. 12/476,195 (7 pages).
Non-Final Office Action mailed on Jun. 24, 2009, in U.S. Appl. No. 11/749,508 (11 pages).

(56) References Cited

OTHER PUBLICATIONS

Non-Final Office Action mailed on May 13, 2010, in U.S. Appl. No. 11/749,508 (12 pages).
Non-Final Office Action mailed Sep. 5, 2008, in U.S. Appl. No. 10/610,487 (27 pages).
Non-Final Office Action mailed Sep. 5, 2008, in U.S. Appl. No. 09/881,502 (9 pages).
Non-Final Rejection mailed Apr. 28, 2010, in U.S. Appl. No. 10/882,009 (5 pgs).
Non-Final Rejection mailed Oct. 14, 2008, in U.S. Appl. No. 10/882,009 (11 pgs).
Non-Final Rejection mailed Oct. 14, 2009, in U.S. Appl. No. 10/882,009 (11 pgs).
Notice of Allowance mailed Apr. 4, 2011, in U.S. Appl. No. 10/882,009 (7 pgs.).
Notice of Allowance mailed May 11, 2011, in U.S. Appl. No. 10/882,009 (7 pgs.).
Notice of Allowance mailed May 29, 2012, in U.S. Appl. No. 09/882,857 (5 pgs).
Notice of Allowance mailed Aug. 18, 2011, in U.S. Appl. No. 10/882,009 (7 pgs.).
Notice of Allowance mailed Aug. 25, 2010, in U.S. Appl. No. 10/882,009 (4 pgs.).
Notice of Allowance mailed Dec. 16, 2010, in U.S. Appl. No. 10/882,009 (6 pgs.).
Notice of Allowance mailed Apr. 10, 2009, in U.S. Appl. No. 10/609,818 (6 pages).
Notice of Allowance mailed Apr. 14, 2006, in U.S. Appl. No. 09/596,365 (4 pages).
Notice of Allowance mailed Jan. 26, 2007, in U.S. Appl. No. 10/220,419 (13 pages).
Notice of Allowance mailed Jul. 23, 2010, in U.S. Appl. No. 10/021,621 (7 pages).
Notice of Allowance mailed Jun. 27, 2008, in U.S Appl. No. 09/595,401 (6 pages).
Notice of Allowance mailed Jun. 27, 2008, in U.S. Appl. No. 10/611,491 (17 pages).
Notice of Allowance mailed May 16, 2011, in U.S. Appl. No. 12/476,195 (8 pgs).
Notice of Allowance mailed May 6, 2011, in U.S. Appl. No. 10/220,550 (10 pgs).
Notice of Allowance mailed Nov. 30, 2006, in U.S. Appl. No. 09/596,365 (7 pages).
Notice of Allowance mailed on Aug. 21, 2008, in U.S. Appl. No. 11/737,247 (11 pages).
Notice of Allowance mailed on Feb. 18, 2011, in U.S. Appl. No. 11/749,508 (9 pages).
Notice of Allowance mailed on Feb. 22, 2010, in U.S. Appl. No. 10/610,487 (4 pages).
Palme, Jacob et al. Issues when designing filters in messaging systems, Computer Communications, Jan. 11, 1995 (7 pages).
Partial European Search Report completed on Oct. 11, 2004, in European Patent Application No. 04 10 2332 (3 pgs).
Platt, Fast training of support vector machines using sequential minimal optimization, in advances in kernel methods, support vector learning, 1999, pp. 41-65 MIT Press, Cambridge, MA.
Platt, J. Probabilistic outputs for support vector machines and comparisons to regularized likelihood methods, In Advances in Large Margin Classifiers, 1999, 11 pages, MIT Press, Cambridge, MA.
Preliminary Amendment filed Jun. 10, 2008, in U.S. Appl. No. 09/595,401 (17 pages).
RCE/Amendment filed in Response to Examiner Answer to Appeal Brief mailed Apr. 2, 2008, in U.S. Appl. No. 10/220,550, filed Mar. 18, 2011 (8 pgs).
RCE/Response to Final Action (Sep. 22, 2005), filed Dec. 22, 2005, in U.S. Appl. No. 10/220,550 (16 pages).
Reply Brief filed Apr. 21, 2004, in U.S. Appl. No. 09/595,401 (5 pages).
Reply Brief Filed Jun. 16, 2009, in U.S. Appl. No. 09/882,857 (7 pages).
Reply Brief to Examiner's Answer to Appeal Brief (Apr. 20, 2006), filed Jun. 20, 2006, in U.S. Appl. No. 10/021,621 (26 pages).
Reply Communication from the Examining Division (May 30, 2003), filed Oct. 9, 2003, in European Patent Application No. 01 920 508.7 (6 pages).
Reply Communication from the Examining Division (Sep. 24, 2007), filed Jan. 28, 2008, in European Patent Application No. 01 922 463.3 (31 pages).
Reply Communication from the Examining Division (Sep. 5, 2005), filed May 15, 2006, in European Patent Application No. 01 920 508.7 (14 pages).
Reply to Communication from the Examination Division (Jan. 3, 2008), filed Apr. 24, 2008, in European Patent Office Application No. 07 013 320.2 (16 pages).
Reply to Communication from the Examination Division (Jul. 14, 2006), filed Nov. 20, 2006, in European Patent Office Application No. 04 000 621.5 (12 pages).
Reply to Communication from the Examination Division (Mar. 27, 2006), filed Oct. 5, 2006, in European Patent Office Application No. 04 102 332.6 (18 pages).
Reply to Communication from the Examination Division (Nov. 12, 2009), filed Mar. 4, 2010, in European Patent Office Application No. 05 105 299.1 (20 pages).
Reply to Communication from the Examination Division (Nov. 15, 2006), filed May 14, 2007, in European Patent Office Application No. 04 102 332.6 (17 pages).
Reply to Communication from the Examination Division (Nov. 6, 2006), filed Mar. 14, 2007, in European Patent Office Application No. 05 105 299.1 (13 pages).
Reply to Communication from the Examination Division (Sep. 11, 2008), filed Jan. 21, 2009, in European Patent Office Application No. 07 013 320.2 (9 pages).
Reply to Communication from the Examination Division (Sep. 13, 2007), filed Jan. 22, 2008, in European Patent Office Application No. 04 755 824.2 (25 pages).
Reply to Communication from the Examining Division (Apr. 19, 2006), filed Aug. 11, 2006, in European Patent Application No. 02 025 530.3 (5 pages).
Reply to Examiner's Answer to Appeal Brief (Jan. 27, 2006), filed Mar. 27, 2006, in U.S. Appl. No. 09/881,502 (4 pages).
Reply to Notice of Non-Compliant Appeal Brief (Nov. 23, 2007), filed Dec. 21, 2007, in U.S. Appl. No. 10/220,550 (22 pages).
Reply to Notice of Non-Compliant Appeal Brief filed Aug. 30, 2007, in U.S. Appl. No. 10/220,550 (22 pages).
Response Brief to Examiner's Answer's to Appeal Briefs (Nov. 3, 2006 and Dec. 13, 2006), filed Jan. 3, 2007, in U.S. Appl. No. 09/595,401 (5 pages).
Response Final Office Action (Sep. 22, 2005), filed Oct. 28, 2005, in U.S. Appl. No. 10/220,550 (17 pages).
Response to Final Office Action (Apr. 18, 2006), filed Jun. 7, 2006, in U.S. Appl. No. 09/595,401 (18 pages).
Response to Final Office Action (Apr. 30, 2009), filed Jul. 21, 2009, in U.S. Appl. No. 09/881,502 (10 pages).
Response to Final Office Action (Aug. 13, 2007), filed Oct. 25, 2007, in U.S. Appl. No. 09/882,857 (11 pages).
Response to Final Office Action (Feb. 4, 2008), filed Apr. 4, 2008, in U.S. Appl. No. 10/021,621 (30 pages).
Response to Final Office Action (Jan. 14, 2004), filed Apr. 14, 2004, in U.S. Appl. No. 09/596,365 (14 pages).
Response to Final Office Action (Jan. 14, 2010), filed on Apr. 14, 2010, in U.S. Appl. No. 11/749,508 (12 pages).
Response to Final Office Action (Jul. 22, 2008), filed Aug. 27, 2008, in U.S. Appl. No. 10/609,818 (16 pages).
Response to Final Office Action (Jul. 22, 2008), filed Sep. 22, 2008, in U.S. Appl. No. 09/882,857 (7 pages).
Response to Final Office Action (Jul. 24, 2007), filed on Aug. 21, 2007, in U.S. Appl. No. 10/609,818 (13 pages).
Response to Final Office Action (Jul. 25, 2003), filed Dec. 4, 2003, in U.S. Appl. No. 09/595,401 (19 pages).
Response to Final Office Action (Jul. 25, 2003), filed Oct. 27, 2003, in U.S. Appl. No. 09/595,401 (16 pages).
Response to Final Office Action (Jun. 3, 2005), filed Aug. 2, 2005, in U.S Appl. No. 09/881,502 (4 pages).

(56) References Cited

OTHER PUBLICATIONS

Response to Final Office Action (Mar. 18, 2009), filed on Jul. 16, 2009, in U.S. Appl. No. 10/610,487 (16 pages).
Response to Final Office Action (Nov. 2, 2005), filed Dec. 12, 2005, in U.S. Appl. No. 09/882,857 (11 pages).
Response to Final Office Action (Oct. 21, 2004), filed Dec. 8, 2004, in U.S. Appl. No. 09/882,857 (16 pages).
Response to Final Office Action (Oct. 4, 2006), filed Dec. 1, 2006, in U.S. Appl. No. 10/220,550 (19 pages).
Response to Final Office Action (Oct. 4, 2007), filed Oct. 31, 2007, in U.S. Appl. No. 10/611,491 (11 pages).
Response to Final Office Action (Sep. 20, 2005), filed Oct. 28, 2005, in U.S. Appl. No. 10/021,621 (22 pages).
Response to Final Office Action (Sep. 25, 2006), filed Nov. 22, 2006, in United States Patent Application No. 09/882,857 (9 pages).
Response to Final Office Action mailed on Oct. 29, 2010, in U.S. Appl. No. 11/749,508, filed Jan. 31, 2011 (14 pages).
Response to Final Rejection mailed Apr. 29, 2009, filed Jul. 14, 2009 in U.S. Appl. No. 10/882,009 (14 pgs).
Response to Non-Final Office Action (Apr. 10, 2007), filed Jul. 10, 2007, in U.S. Appl. No. 10/611,491 (13 pages).
Response to Non-Final Office Action (Apr. 4, 2006), filed Jun. 30, 2006, in U.S. Appl. No. 09/882,857 (9 pages).
Response to Non-Final Office Action (Aug. 24, 2007), filed Nov. 21, 2007, in U.S. Appl. No. 10/021,621 (29 pages).
Response to Non-Final Office Action (Aug. 7, 2006), filed Oct. 29, 2006, in U.S. Appl. No. 09/596,365 (16 pages).
Response to Non-Final Office Action (Dec. 2, 2004), filed Mar. 2, 2005, in U.S. Appl. No. 09/881,502 (4 pages).
Response to Non-Final Office Action (Dec. 28, 2005), filed Mar. 27, 2006, in U.S. Appl. No. 09/595,401 (20 pages).
Response to Non-Final Office Action (Feb. 21, 2008), filed on May 21, 2008, in U.S. Appl. No. 11/737,247 (14 pages).
Response to Non-Final Office Action (Feb. 22, 2008), filed on May 22, 2008, in U.S. Appl. No. 10/610,487 (13 pages).
Response to Non-Final Office Action (Feb. 28, 2007), filed on May 25, 2007, in U.S. Appl. No. 10/609,818 (12 pages).
Response to Non-Final Office Action (Jan. 14, 2008), filed Apr. 10, 2008, in U.S. Appl. No. 10/611,491 (15 pages).
Response to Non-Final Office Action (Jan. 2, 2004), filed May 20, 2004, in U.S. Appl. No. 09/882,857 (13 pages).
Response to Non-Final Office Action (Jan. 21, 2010), filed Apr. 21, 2010, in U.S. Appl. No. 10/021,621 (18 pages).
Response to Non-Final Office Action (Jan. 25, 2008), filed Apr. 14, 2008, in U.S. Appl. No. 09/882,857 (11 pages).
Response to Non-Final Office Action (Jan. 3, 2008), filed Mar. 12, 2008, in U.S. Appl. No. 10/609,818 (16 pages).
Response to Non-Final Office Action (Jan. 8, 2003), filed Jun. 9, 2003, in U.S. Appl. No. 09/595,401 (15 pages).
Response to Non-Final Office Action (Jun. 24, 2009), filed on Sep. 24, 2009, in U.S. Appl. No. 11/749,508 (12 pages).
Response to Non-Final Office Action (Jun. 27, 2003), filed Nov. 4, 2003, in U.S. Appl. No. 09/596,365 (13 pages).
Response to Non-Final Office Action (Mar. 18, 2005), filed Jun. 13, 2005, in U.S. Appl. No. 10/220,550 (19 pages).
Response to Non-Final Office Action (Mar. 20, 2005), mailed Aug. 17, 2005, in U.S. Appl. No. 09/882,857 (13 pages).
Response to Non-Final Office Action (Mar. 22, 2007), filed Jun. 22, 2007, in U.S. Appl. No. 09/882,857 (9 pages).
Response to Non-Final Office Action (Mar. 30, 2006), filed Jun. 28, 2006, in U.S. Appl. No. 10/220,550 (10 pages).
Response to Non-Final Office Action (Oct. 14, 2009), filed Jan. 14, 2010, in U.S. Appl. No. 09/881,502 (14 pages).
Response to Non-Final Office Action (Oct. 16, 2007), in U.S. Appl. No. 10/609,818 (13 pages).
Response to Non-Final Office Action (Oct. 4, 2006), filed Jan. 4, 2007, in U.S. Appl. No. 10/220,419 (13 pages).
Response to Non-Final Office Action (Sep. 26, 2005), filed Dec. 5, 2005, in U.S. Appl. No. 09/596,365 (12 pages).
Response to Non-Final Office Action (Sep. 5, 2008), filed Jan. 5, 2009, in U.S. Appl. No. 09/881,502 (11 pages).
Response to Non-Final Office Action (Sep. 5, 2008), filed on Dec. 5, 2008, in U.S. Appl. No. 10/610,487 (21 pages).
Response to Non-Final Office Action mailed Jan. 7, 2011, in U.S. Appl. No. 12/476,195, filed Apr. 7, 2011 (10 pages).
Response to Non-Final Office Action mailed Mar. 22, 2005, filed Jul. 11, 2005, in U.S. Appl. No. 10/021,621 (25 pages).
Response to Non-Final Office Action mailed Oct. 1, 2009, filed on Jan. 4, 2010, in U.S. Appl. No. 10/610,487 (15 pages).
Response to Non-Final Office Action mailed on May 13, 2010, in U.S. Appl. No. 11/749,508, filed Aug. 9, 2010 (13 pgs).
Response to Non-Final Rejection mailed Apr. 28, 2010, filed Jul. 28, 2010 in U.S. Appl. No. 10/882009 (12 pgs).
Response to Non-Final Rejection mailed Oct. 14, 2008, filed Jan. 14, 2009 in U.S. Appl. No. 10/882,009 (12 pgs).
Response to Non-Final Rejection mailed Oct. 14, 2009, filed Jan. 14, 2010 in U.S. Appl. No. 10/882,009 (14 pgs).
Results of Consultation mailed Nov. 20, 2009, in European Patent Application No. 04 755 824.2 (8 pgs).
Rhodes, Bradley J. The Wearable Remembrance Agent: A System for Augmented Theory, The Proceedings of the First International Symposium on Wearable Computers, Oct. 1997, pp. 123-128.
Rhodes, Bradley J. Remembrance Agent: A continuously running automated information retrieval system. The Proceedings of the First International Conference on the Practical Application of Intelligent Agents and Meld Agent Technology, 1996, pp. 487-495.
Sahami, M. et al. A Bayesian approach to filtering junk email, in Workshop on learning for text categorizations, 1998, 8 pages, AN Technical Report WS-98-05, AAAI.
Sawhney, Nitin et al., Nomadic Radio: Speech and Audio Interaction for Contextual Messaging in Nomadic Environments, ACM Transactions on Computer-Human Interaction, ACM, Sep. 1, 2000, pp. 353-383.
Sawhney, Nitin, et al., Speaking and Listening on the Run: Design for Wearable Audio Computing, 1998, 8 pages.
Schilit, Bill et al, Context-Aware Computing Applications, In Proceedings alba Workshop on Mobile Computing Systems and Applications, Dec. 1994. pp. 85-90.
Schilit, Bill N. et al., Customizing Mobile Applications, Proceedings USENIX Symposium on Mobile and Location Independent Computing, Aug. 1993, 9 pages.
Schilit, Bill N. et al., Disseminating Active Map Information to Mobile Hosts, IEEE Network, 1994, pp. 22-32, vol. 8—No. 5.
Schilit, Bill N. et al., The ParcTab Mobile Computing System, IEEE WW0S-1V, 1993, 4 pages.
Schilt, William Noah A System Architecture for Context Aware Mobile Computing, Columbia University, 1995, 153 pages.
Sehgmann, Doree Duncan et al., The Message is the Medium, 1997, 12 pages.
Shell, Jeffrey S., Ted Selker, and Roel Vertegaal. Interacting with Groups of Computers. Communications of the ACM, vol. 46 Issue 3, pp. 40-46, 2003.
Spreitzer, Mike et al. Scalable, Secure, Mobile Computing with Location Information, Communications of the ACM. Jul. 1993. 1 page. vol. 36—No. 7.
Spreitzer, Mike et al., Architectural Considerations for Scalable, Secure, Mobile Computing with Location Information, in The 14th International Conference on Distributed Computing Systems, lone 1994, pp. 29-39.
Spreitzer, Mike et al., Providing Location Information in a Ubiquitous Computing Environment, STOOPS '93, 1993, pp. 270-283.
Starner, Thad Eugene Wearable Computing and Contextual Awareness, Massachusetts Institute of Technology, Jun. 1999, 248 pages.
Submission Pursuant to 37 CFR § 1.114 filed Feb. 29, 2008, in U.S. Appl. No. 09/881,502 (7 pages).
Submission Pursuant to 37 CFR § 1.114 mailed Sep. 23, 2005, in U.S. Appl. No. 09/595,401 (15 pages).
Submission Pursuant to 37 CFR § 1.114, filed Apr. 10, 2008, in U.S. Appl. No. 09/595,401 (16 pages).
Submission Pursuant to 37 CFR § 1.114, filed May 14, 2007, in U.S. Appl. No. 10/021,621 (23 pages).

(56) References Cited

OTHER PUBLICATIONS

Summons to Attend Oral Proceedings mailed Jun. 8, 2009, in European Patent Application No. 04 755 824.2 (12 pgs).
Summons to Attend Oral Proceedings mailed Nov. 27, 2008, in European Patent Office Application No. 04 000 621.5 (10 pages).
Supplemental Notice of Allowability mailed Jun. 1, 2009, in U.S. Appl. No. 09/595,401 (2 pages).
Supplemental Notice of Allowability mailed May 26, 2011, in U.S. Appl. No. 11/749,508 (6 pgs).
Supplemental Notice of Allowance mailed on Apr. 16, 2010, in U.S. Appl. No. 10/610,487 (2 pages).
Supplemental Response filed Apr. 13, 2010, in U.S. Appl. No. 10/882,009 (9 pgs).
Supplemental Response to Final Office Action mailed Sep. 25, 2006, filed Dec. 26, 2006, in U.S. Appl. No. 09/882,857 (9 pages).
Supplemental Response to Non-Final Office Action (Oct. 1, 2009), filed Jan. 15, 2010, in U.S. Appl. No. 10/610,487 (15 pages).
Supplemental Response to Non-Final Office Action (Sep. 5, 2008), filed Feb. 6, 2009, in U.S. Appl. No. 09/881,502 (11 pages).
Susuki, et al., Technique of Using Mobile & Network (3). Interop Magazine. Sep. 1, 1999; 9(7): 170-73, Japanese.
Taiwan Notice of Allowance mailed Nov. 30, 2012, in Application No. 93114979 (13 pages).
Takkinen, Juha et al., CAFE: A Conceptual Model for Managing Information in Electronic Mail, 1998, 12 pages.
Tategami, Tatsuhiko "Reading Mail Received on Personal Computer in i-mode, Every Mail Transfer," *Associated Utilization Technique of i-mode + Personal Computer*, 1s$^t$ Ed., pp. 5-31, AI Publishing, Japan, Aug. 28, 2000.
Theimer, Marvin et al., Operating *System Issues for* PDAs, in Fourth Workshop on Workstation Operating Systems, 1993, 7 pages.
Tsatsoulis, Costas et al., Integrating Case-Based Reasoning and Decision Theory, 1997, 10 pages.
US Notice of Allowance mailed Nov. 9, 2012, in U.S. Appl. No. 12/259,157 (10 pages).
Vertegaal, Roel. Designing Attentive Interfaces. Proceedings of the Symposium on ETRA 2002: Eye tracking research and applications symposium, pp. 23-30, 2002.
Want, Roy Active Badges and Personal Interactive Computing Objects, IEEE Transactions on Consumer Electronics, 1992, 11 pages, vol. 38—No. 1.
Want, Roy et al., The Active Badge Location System, ACM Transactions on Information Systems, Jan. 1992, pp. 92-102. vol. 10—No. 1.
Weiser, Mark Some Computer Science Issues in Ubiquitous Computing, Communications of the ACM, Jul. 1993, pp. 75-84. vol. 36—No. 7.
Weiser, Mark The Computer for the 21st Century, Scientific American, Sep. 1991, 8 pages.
Workshop on Wearable Computing Symms, Aug. 19-21, 1996.
Written Submission in Preparation to/during Oral Proceedings, filed Jan. 26, 2009, in European Patent Office Application No. 04 000 621.5 (49 pages).
Canadian Notice of Allowance mailed Feb. 11, 2013, in Application No. 2511102 (1 pages).
European Application 04755824.2, Response to Summons dated Apr. 9, 2013 (50 pages).
European Application 04755824.2, Summons to Oral Proceedings dated Feb. 13, 2013 (13 pages).
Japanese Application 2001-567443, Appeal Decision dated Jan. 29, 2013 (4 pages).
European Application 04755824.2, Minutes from Oral Proceedings mailed May 22, 2013, 3 pages.

\* cited by examiner

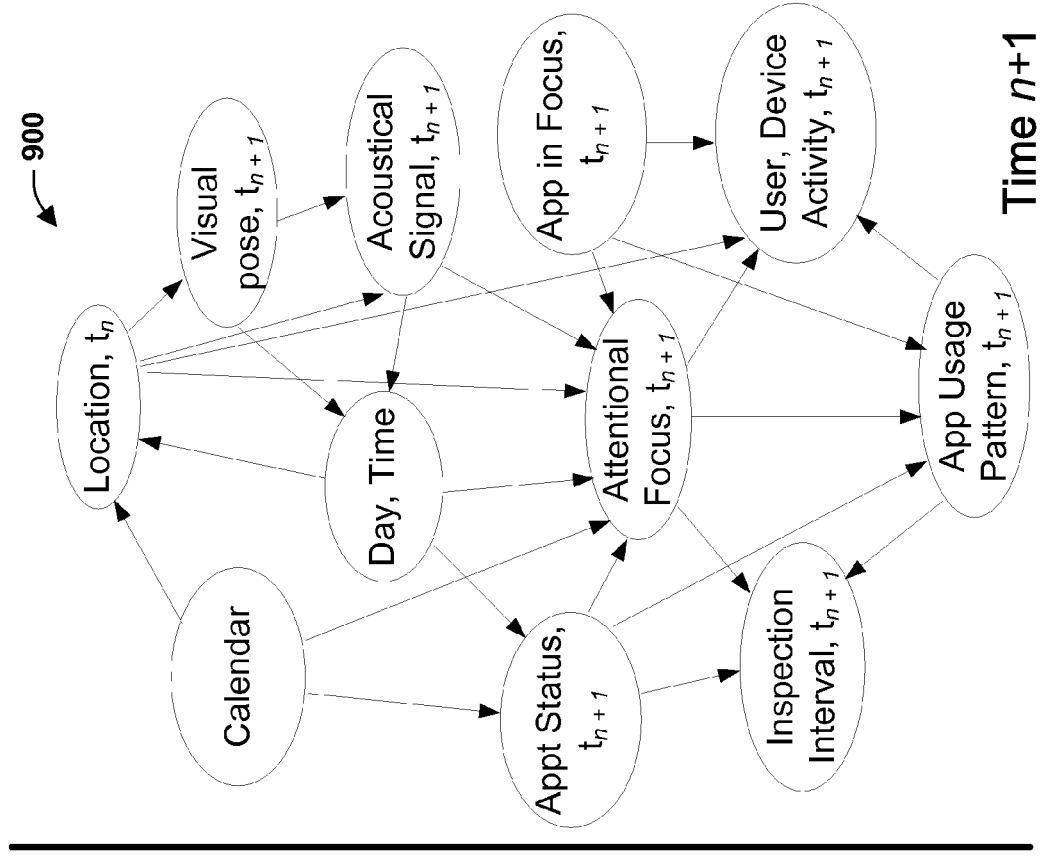
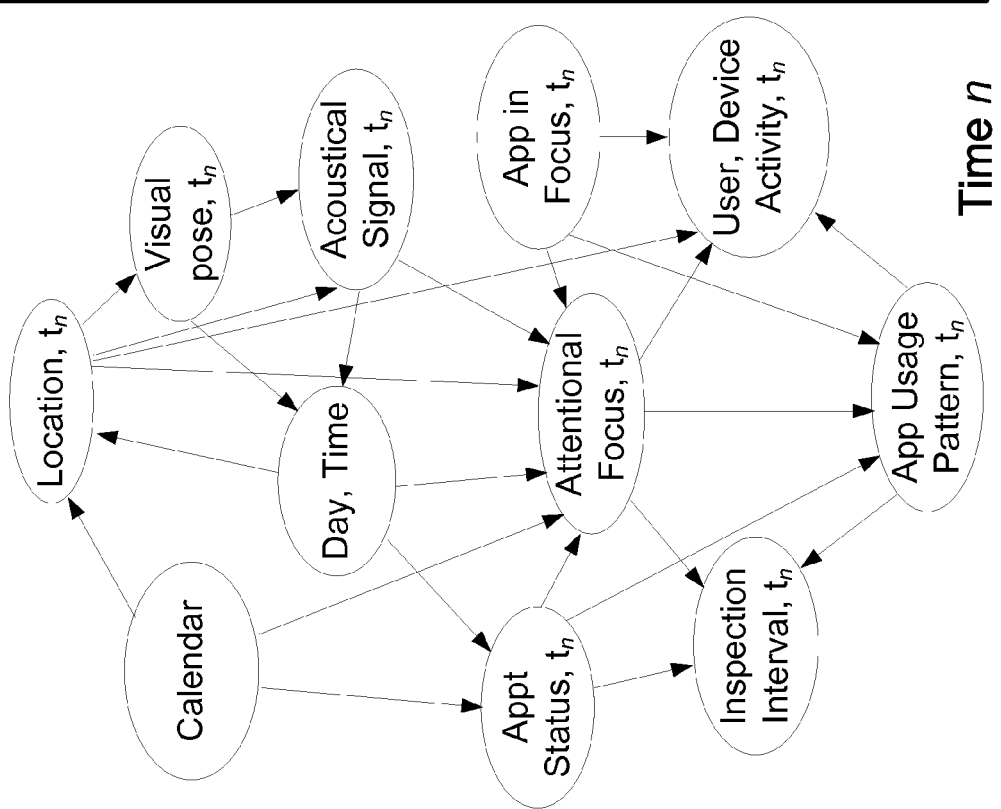
FIG. 9

BOUNDED-DEFERRAL POLICIES FOR GUIDING THE TIMING OF ALERTING, INTERACTION AND COMMUNICATIONS USING LOCAL SENSORY INFORMATION

REFERENCE TO RELATED APPLICATIONS

This application is a continuation of U.S. patent application Ser. No. 10/611,491 filed on Jun. 30, 2003, U.S. Pat. No. 7,444,383, entitled BOUNDED-DEFERRAL POLICIES FOR GUIDING THE TIMING OF ALERTING, INTERACTION AND COMMUNICATIONS USING LOCAL SENSORY INFORMATION, which is a continuation in part of U.S. patent application Ser. No. 10/220,550 filed on Aug. 30, 2002, U.S. Pat. No. 8,024,415, entitled PRIORITIES GENERATION AND MANAGEMENT, which claims priority to PCT Application Serial No. PCT/US01/08710, filed on Mar. 16, 2001, which claims the benefit of U.S. Provisional Patent Application Ser. No. 60/189,801, filed on Mar. 16, 2000, entitled ATTENTIONAL SYSTEMS AND INTERFACES.

U.S. patent application Ser. No. 10/611,491 filed on Jun. 30, 2003, of which this application is a continuation, is also a continuation in part of U.S. patent application Ser. No. 10/220,419 filed on Aug. 30, 2002, U.S. Pat. No. 7,243,130 entitled NOTIFICATION PLATFORM ARCHITECTURE, which claims priority to PCT Application Serial No. PCT/US01/08711, filed on Mar. 16, 2001, which claims the benefit of U.S. Provisional Patent Application Ser. No. 60/189,801, filed on Mar. 16, 2000, entitled ATTENTIONAL SYSTEMS AND INTERFACES.

Further, this application is a continuation in part of U.S. patent application Ser. No. 09/881,502 filed on Jun. 14, 2001, ABN, entitled BOUNDED-DEFERRAL POLICIES FOR REDUCING THE DISRUPTIVENESS OF NOTIFICATIONS, which claims the benefit of U.S. Provisional Patent Application Ser. No. 60/212,296, filed on Jun. 17, 2000, entitled HEURISTIC COMMUNICATIONS POLICIES FOR A NOTIFICATION PLATFORM. U.S. patent application Ser. No. 09/881,502 also is a continuation in part of PCT Application Serial No. PCT/US01/08710, filed on Mar. 16, 2001, and PCT Application Serial No. PCT/US01/08711, filed on Mar. 16, 2001, which both claim benefit of U.S. Provisional Patent Application Ser. No. 60/189,801, filed on Mar. 16, 2000, entitled ATTENTIONAL SYSTEMS AND INTERFACES.

Furthermore, this application claims the benefit of U.S. Provisional Patent Application Ser. No. 60/450,841, filed on Feb. 28, 2003, entitled SYSTEM AND METHOD THAT FACILITATES COMMUNICATION. All of the aforementioned applications are incorporated herein by reference.

TECHNICAL FIELD

The present invention relates generally to systems and methods that facilitate communications between devices, systems, processes, and/or individuals. More particularly, the present invention relates to smart sensing of endpoint devices that are employed with various communications systems and in accordance with bounded deferral policies for minimizing the disruptiveness of notifications.

BACKGROUND OF THE INVENTION

Despite the impressive abilities of people to sense, remember, and reason about the world, cognitive abilities are extremely limited in well-characterized ways. In particular, psychologists have found that people wrestle with scarce attentional resources and limited working memory. Such limitations become salient when people are challenged with remembering more than a handful of new ideas or items in the short term, recognizing important targets against a background pattern of items, or interleaving multiple tasks.

These results indicate that people must typically inspect the world through a limited spotlight of attention. As such, most people often generate clues implicitly and explicitly about what they are selectively attending to and how deeply they are focusing. Findings about limited attentional resources have significant implications for how computational systems and interfaces are designed.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and method to facilitate communications of important messages or communications. Policies are described that consider a user's current situation, including the consideration of an inferred cost of interruption, or directly sensed surrogates for such a cost, in decisions about the best time, within a deadline for delivering messages. Deadlines for delivery depend on the urgency of the information that is inferred or detected from the message sender, type, and content. If a suitable time is not detected within a deadline, the information is delivered at the deadline. If it is determined that a suitable time will not achieved within a deadline, the information is transmitted immediately. Suitable times for delivery can be determined via the use of one or more sensors on or near endpoint devices, including accelerometers, microphones, touch sensing, and gaze and head pose detection. Other information, including appointment status as indicated on a user's calendar, time of day, and previously assessed patterns of availability can be employed in decisions about the deferral of alerts. Endpoint sensors, calendar information, and patterns of availability are also used to identify the likelihood that information will be received at a device. Such information can be passed back directly or in summary to a central notification manager or used locally in decisions about the salience and repetition of alerting.

One particular aspect of the present invention relates to systems and methods that facilitate efficient and timely communications between parties by mitigating disruptiveness associated with notifications. One particular aspect of the invention relates to employment of small devices (e.g., telephones, PDAs, smart pens, watches, eyewear) in connection with message notification and/or best mode to effect communications. In accordance with the subject invention, small devices can be made aware or at least partly aware of various metrics relating to attentional status and/or location of users. Information determined and/or inferred by the small device (s) in connection with the attentional status and/or location can be shared between small devices as well as with disparate devices or systems (e.g., a central Notification Managing system). The information can be disseminated individually, in serial or parallel vis a vis other devices, as well as aggregated. The information can be employed to facilitate providing a notification service and/or determining or inferring a best mode in which to effect communications with and between users.

One example aspect provides for employment of bounded-deferral policies wherein a local device commits to relaying a message that it has received before a message-specific deadline is reached; the device in accordance with the invention attempts to determine or infer a most appropriate time for interruption within an allotted period. Such determination or inference can employ statistical-based and/or probabilistic-based and/or utility-based (e.g., benefit of interruption given cost of interruption) techniques. Devices in accordance with the subject invention can employ various sensing modalities (e.g., MEMS-based sensors, temperature sensors, accelerometers, gyroscopes, light-based sensors, time-based sensors, GPS, 802.11 signal strength, infrared proximity detectors, touch sensors, . . . ) in connection with learning or inferring an attentional status and/or location of users. With respect to sharing and/or sending sensed states, it is to be appreciated that all sensed states, subsets or summaries thereof can be communicated.

Another aspect of the invention provides for taking into consideration states of the device(s) and surrounding environment as well. For example, transmission reliability (transrel) of the device can be considered (e.g., on a sliding scale representing the P(transrel|context), that is the likelihood of getting through on a device given context (is a function such as for example f(context) or f(sensed states).

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIG. 9 is an influence diagram illustrating a temporal Bayesian attentional model in accordance with an aspect of the present invention.

DETAILED DESCRIPTION OF THE INVENTION

Figure 1:
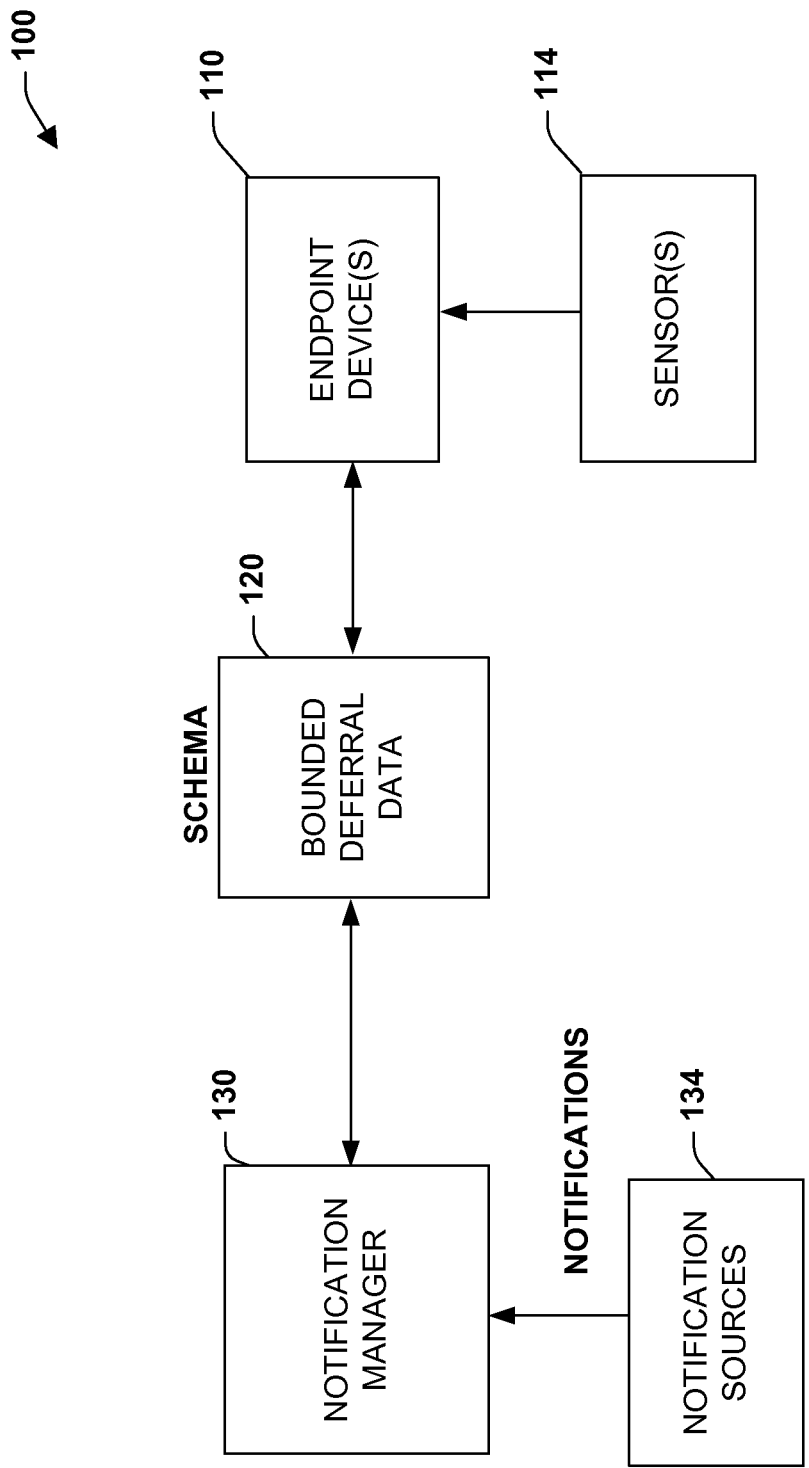
FIG. 1 is a schematic block diagram illustrating endpoint device communications in accordance with an aspect of the present invention.

The present invention relates to a system and method to facilitate communications between parties, based on a consideration of context of a user, where context is taken to include such background information as a user's appointment status encoded on a user's digital calendar and information that is sensed locally through sensors on or near a device. We introduce two constructs and messaging policies that take advantage of such local sensing for alerting users about important information: bounded deferral and transmission reliability. Bounded deferral addresses the timeliness of alerts, providing a means for allowing a system to find a good time, while bounded the costs associated with the loss of value with delay of information. Transmission reliability informs a notification system about the best device and alerting means available for communication a message.

Bounded-deferral policies define a deadline for making a user aware of a message containing information of value to the user, where the tolerance or deferral period is dependent on a determined time-dependent urgency for the information. Deadlines for alerting the user, or deferral tolerances, are assigned to messages that are transmitted to endpoint devices such as a mobile phone or handheld computer. Such tolerances may be assigned locally, at an endpoint device or by a more central notification manager. The deferral tolerances are considered by the endpoint device, in conjunction with stored or sensed information related to a user's context and availability. Transmission reliability refers to the probability that a message will get through to a user given the situation sensed by endpoint sensors and/or other relevant information such as information about a user's appointments as stored in a calendar.

Bounded deferral policies are employed, for example, wherein a local device commits to relaying a message that the device has received before a message-specific deadline is reached. The device then autonomously determines a suitable time for interruption within an allotted period. Endpoint devices can leverage multiple perceptual sensors including GPS, 802.11 signal strength, accelerometers, infrared proximity detectors, and touch sensors, for example.

Bounded deferral and transmission reliability can interact. Bounded deferral policies can leverage considerations of transmission reliability. For example, a user may be reachable with a loud alert but prefers to be notified with a gentle buzz, e.g., via the vibration of a cell phone. If the transmission reliability of a gentle buzz becomes high enough before a deferral tolerance is reached, the user can be buzzed gently, bypassing the need for the loud alert.

In another aspect, bounded deferral can be applied to putting a caller on hold, (e.g., while the user typing, etc.) and trying to break through to the user at a suitable time over some short time horizon (e.g., providing a caller with an intermittent message such as "still trying please continue to wait now, or press the # key to go directly to voice mail"). The system may be successful at finding a suitable context to put the call through or not, and thus give up and provide the user with other options such as rescheduling the call and or forwarding the user to voice mail with an apology for the wait. This type of switching and decision-making can be executed by the endpoint device itself, or by a larger phone system, (e.g., a corporate PBX, etc.) that has access to the local sensors. Also, bounded deferral policies can be can be coordinated with other parameters such as information about the user's location and/or context (e.g., if I am in a movie theater, do not interrupt me unless an emergency message comes from my home after a deferral tolerance period has elapsed).

As used in this application, the terms "component," "service," "model," and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to deterministic or logical reasoning techniques, including methods employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to FIG. 1, a system 100 illustrates endpoint device communications in accordance with an aspect of the present invention. One or more
endpoint devices 110 are associated with one or more sensors 114 (e.g., motion, proximity) and bounded deferral data 120 in order to facilitate communications with a user. The bounded deferral data 120 is typically determined and generated by a notification manager 130 that routes notifications from various notification sources 134 to the endpoint devices 110. It is to be appreciated that the endpoint devices 110 may also determine bounded deferral data 120 in accordance with the present invention.

Bounded deferral data 120 for the endpoint devices 110 is determined in consideration of a tolerated period, called a deferral period that is a generally a function of a notification sender and/or a type of message delivered. When messages are received by the endpoint device 110, the device employs its sensors 114 locally to determine a suitable time within an indicated bounded deferral period to alert a user. Typically, the more urgent messages are, the shorter the deferral period. For example, the notification manager 130 may have just received a message from a notification source 124 and attempts to deliver the message in accordance with a bounded deferral period specified by the bounded deferral data 120.

Typically, the notification manager 130 makes general decisions about notification routing and relies on the endpoint device 110 to actually deliver the message to the user within the determined deferral period. However, the endpoint device 110 may detect that a user is currently involved in strenuous activity (e.g., accelerometer indicating fast movement). As such, even though a message delivery deadline is approaching as defined by the bounded deferral data 120, the endpoint device 110 may still delay delivery of the message based upon detected activities or attentional state of the user.

It is noted that bounded deferral generally relates to the concept that messages are assigned locally or centrally with a bounded deferral tolerance that dictates a deadline for making a user aware of a message containing information of value to the user, where the tolerance or deferral is dependent on the urgency of the information. Also, a transmission reliability may also be considered, based potentially on locally sensed information which is related to a probability that a message will get through to a user given endpoint sensing and/or estimates given background information as will be described in more detail below.

Bounded deferral parameters can be determined via local sensors, calendar information, an alerting type, and/or time of day, for example to determine that a user is too busy to receive an alert either now or for the next x minutes. If the deadline is reached and the alert has not yet been delivered, it is delivered at deadline. If a deadline will pass definitively (e.g., as determined from calendar information) and there is no sense in waiting for a "better time," then the alert is passed immediately as there is nothing to be gained by waiting.

Sensors can be employed for various determinations such as determining when a user is currently busy and when a user is available to receive messages. Sensors can also indicate us what the transmission reliability is. Such sensor information can be passed directly off to a central notification manager, e.g., a general notification platform that is deliberating about where to send messages, or in another application, an endpoint device itself can compute a transmission reliability (abbreviated as transrel) from its sensors and pass back the summary transmission reliability to a central notification manager which considers this in its deliberation. For example, a temperature sensor on a cell phone can indicate to the cell phone that it is indeed in a user's pocket right now, thus there is a high transrel to vibrating or ringing the cell phone to get through to the user.

In a conversational dialog system or aspect to the present invention, concepts of bounded deferral can be used to allow a system that performs interactive dialog, either to initiate a conversation or to continue a conversation that has been interrupted by the user's attention being diverted elsewhere for a task or another conversation. For example, in the case of an automated system that is working with a user on a task, whereby a dialog has been broken by someone stepping into a doorway and talking with the user, the system can wait to continue a certain amount of time before, apologizing and breaking in to continue, depending on the time-criticality of continuing the dialog.

It is noted that bounded deferral can be linked to many aspects of a user's experience. For example, bounded deferral policies can be linked to calendar information, where appointments are taken as deterministic bounds on a user's availability (e.g., "user's appointment is ending in 10 minutes; thus it is okay to wait," versus, "user's appointment is ending in 20 minutes; the end of the appointment or task comes after the deferral tolerance. Thus, it is best to simply break in and alert the user immediately). Beyond calendar information, computing systems may be able to access information about the duration of other tasks. For example, tasks of predetermined length may be available in contexts where a user is reviewing media (e.g., a movie or play being watched by a user will end in 7.5 minutes, a commercial break will come at 14 minutes, etc.).

Similarly user's can specify various options about their availability based on the time of day and day of week (e.g., a user may specify in preferences encoded in a notification manager, "Don't relay an alert to me before 8 am and after 11 pm unless you reach a deadline per the deferral tolerance associated with an alert."). A system can thus be charged with attempting to wait, and to hold off on alerting if possible, until the preferred period of time (e.g., between 8 am to 11 pm), but if it cannot wait, it will break through at other times. Also, bounded deferral policies can be dependent on the type of alerting (e.g., device may vibrate gently immediately but if there is no confirmation before the deferral tolerance has been reached, the device alerts the user with a loud tone).

In another approach, rather than breaking through when a deferral tolerance has been reached, the endpoint device can be instructed to send a message back to a central notification manager or the sender of the alert, informing the notification manager that the device was unsuccessful at relaying the message.

It is noted that the notification manager 130 and endpoint devices 110 may employ decision-theoretic approaches when guiding or interrupting notifications to users and are described in more detail below. Global bounded deferral policies can be viewed as approximation of more detailed decision-theoretic analyses. In detailed decision-theoretic analyses, alerts are handled on a case-by-case basis, considering the detailed costs and benefits of alerting for each message and context. Bounded deferral policies allow for the specification of bounds on the total delay, and thus, total loss in the value of information with time for messages of different urgencies. When considering multi-message interactions, such as when a message breaks through to the user, other parties can be allowed to come through as well, even if they would not have broken through to the user on their own. In one example, a value for multiple messages may be determined that leads to a shorter deferral, e.g., the sum of the value (or other function) of the value of independent messages.

Also, a system that has been holding back on several messages that have relatively long deferral tolerances (as they have low time criticality) that have not yet been met, may share the less critical messages at the time that a more time critical message, with a shorter deferral tolerance breaks through to a user. Such breakthroughs may incur most of the cost of information sharing, allowing other messages to pass through at low incremental cost. For example, consider the case where an alert about a meeting reminder to a person breaks through with enough time for the user to travel to a scheduled meeting, based on the user's current location and the location of the meeting. At the time of the breakthrough, the cost of receiving additional messages may not be significantly greater than the initial breakthrough cost. Thus a system, may alert the user with a message, "You have a meeting at the Doubletree Hotel in Bellevue in 20 minutes," and then after this alert is rendered and processed, share with the user messages of lower time criticality, "While I have your attention, tomorrow is Steven's birthday, and Joe Jones will be coming to town next week."

In order to route notifications to the user, the notification manger 130 and/or endpoint devices 110 can include one or more models for reasoning about user states (e.g., attentional state, busyness). Such models can include substantially any type of system such as statistical mathematical models and processes that include the use of Bayesian learning, which can generate Bayesian dependency models, such as Bayesian networks, naïve Bayesian classifiers, and/or Support Vector Machines (SVMs), for example. Other type models or systems can include neural networks and Hidden Markov Models, for example. Although elaborate reasoning models can be employed in accordance with the present invention, it is to be appreciated that other approaches can also utilized. For example, rather than a more thorough probabilistic approach, deterministic assumptions can also be employed (e.g., no cell phone activity for X amount of time may imply by rule that user is not available by phone). Thus, in addition to reasoning under uncertainty as is described in more detail below, logical decisions can also be made regarding the status, location, context, focus, and so forth of users and/or associated devices.

Figure 2:
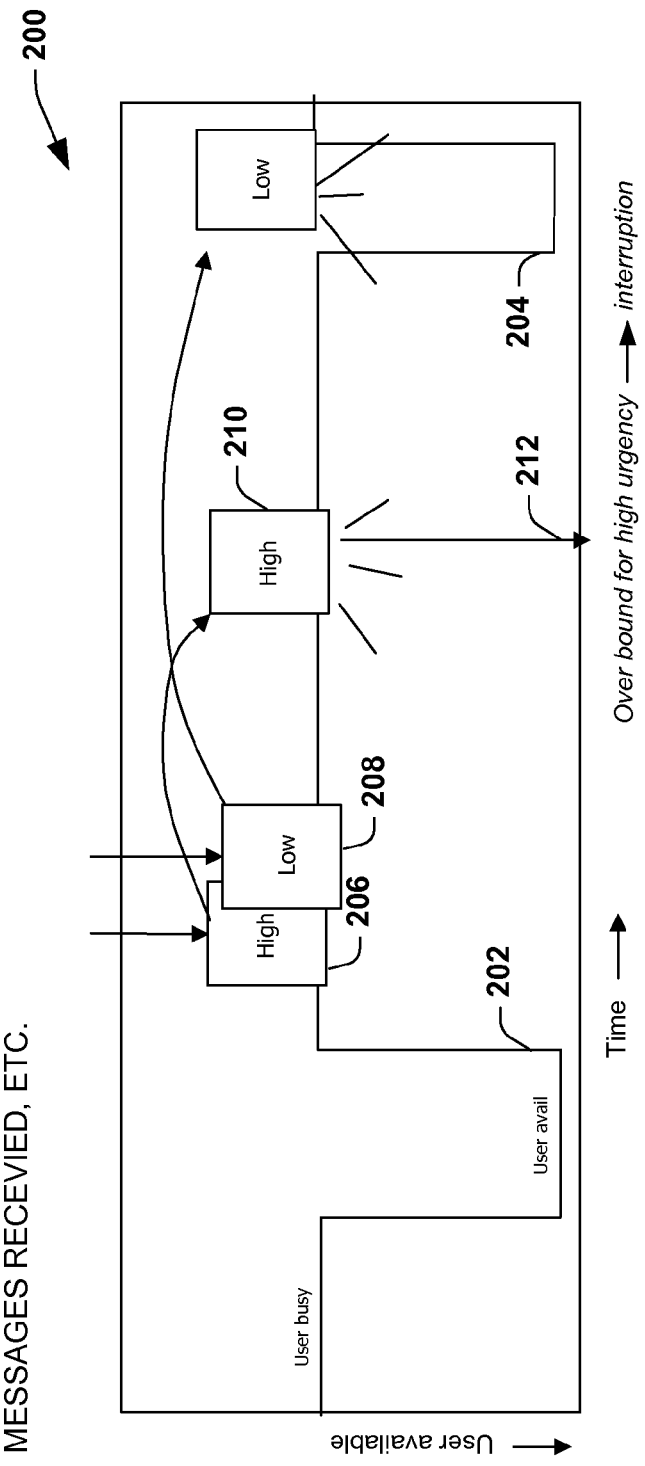
FIG. 2 is a diagram an exemplary bounded deferral policy in accordance with an aspect of the present invention.

Referring now to FIG. 2, a diagram 200 illustrates an exemplary bounded deferral policy in accordance with an aspect of the present invention. According to this aspect, notifications or messages are not typically delivered until an available free state is reached unless a time bound is detected. For example, free states are illustrated at references 202 and 204. During busy states of the user (depicted as opposite to the free states 202, 204) a high and low priority message 206 and 208 are queued by a notification agent or manager (not shown). At 210, a time bound that was set as a max deferral time is reached for the high priority message and thus the high priority message is delivered to the user at 212. The low priority message 208 does not reach a time bound in the illustrated example of FIG. 2. Thus, the low priority message is not delivered until the next available free state at 204. In this manner, disruptiveness of notifications received by the user is mitigated. It is noted, that the time bounds can be influenced by the users context such as workload, number of messages received, and the time dependency of the notification content.

In accordance with the present invention, various algorithms and/or processes are provided for desktop and endpoint device alerting. These processes can be applied to multiple situations such as: (1) User present at desktop or endpoint device; (2) User away from desktop or endpoint device; and (3) User just returning or logging in to a desktop or endpoint device after being away.

For the case where a user is detected to be at a desktop or endpoint device, the following process can generally be applied:

When a notification is received, its age is set to zero and its priority is noted and a list of exceptions is checked.

If a "likely available" state is observed via monitoring the user's activities before the max deferral time for that urgency, the notification is passed through to the user.

Else, the notification is relayed when the deferral tolerance is reached for the notification as depicted above in relation to FIG. 2.

On average, because of the typical smatter of "likely available" states during typical desktop or endpoint device activities, most notifications will tend to be delivered before the max deferral times. However, user's will be more pleased on average with the notification system as notifications will tend more so to occur when the user is free than they would have been had notifications simply been passed through when notifications are received. The probability that a free state will be reached generally increases with time—as there are more opportunities for detecting a likely available state with increasing amounts of time. As the probability of a likely free state increases with increasing amounts of times, lower priority messages will tend to occur with higher-likelihood during these likely free states, and the probability of being disrupted will grow with the increasing priority of the messages.

According to another aspect of the present invention, a display of notifications (e.g., journal, browser, in-box, cell phone message box) can include multiple, or pooled notifications that have been waiting, so as to send to the user a single notification that contains chunks of grouped notifications. Such chunking can present the chunks of notifications in lists ordered by max priority, max age, or max priority by group, etc. For example, if a likely free state has not been detected, and that max deferral time has been reached by a high priority notification, and at the time the max deferral has been reached for the high priority notification, information can be included about the lower priority notifications that are pending in a grouped notification—even though the lower priority notifications will not have obtained an associated max deferral at this time. Several aspects are possible for this kind of chunking, including sending the main alert in a standard notification display, and summarizing other pending alerts in a list at the bottom of the display. Respective items can be clicked on and be reviewed and/or cleared by the user.

According to another aspect of the present invention, a calendar can be examined to enable users to specify uninterruptible meetings (e.g., presentations, video conference, phone meetings) that should not be interrupted (e.g., until some safe time, 10 minutes after end of meeting) except for notifications that are marked as immediate pass through. This can be generalized to utilizing a separate max deferral table and/or function for important meetings. This can be further generalized by enabling calendar items to be one of several classes of appointment and employ different max deferral tables or functions for different classes of meeting.

In another aspect of the present invention, instead of providing a few categories of priority, a continuous range can be provided, such as, 0-100 for an urgency score and the max deferral can be a function of the priority of the notification, including a variety of linear and nonlinear functions (e.g., exponential decay of max deferral time with increasing priority). For example:

$$\text{max deferral(priority)} = e^{-k(priority)} \times 15 \text{ minutes}$$

which is equivalent to $$\text{max deferral(priority)} = e^{-k(priority)} \times \text{max deferral (0 priority)}$$

Additionally, users can specify contexts as a function of type of day (e.g., weekend, holiday, weekday), time of day, and other basic contexts that change value assignments for different classes and subclasses of message (e.g., e-mail, instant messenger communications from family versus business associates).

In another respect, a Notification Journal for items that have not yet been observed by the user can be provided. This can include maintaining a global Notification Journal for substantially all notifications—enabling users to return and access notifications that have been previously received, for example. This can also include providing for rich display and interaction. For example, a click on a journaled item in a Notification or endpoint device Window can bring up the notification. A click on the notification brings up more information or the appropriate user interface for the source of the notification. For example, clicking on a notification about an upcoming appointment brings up a full view of an appointment being referred to by the notification. Also, highlighted links can be displayed within notifications and enable users to jump to web pages, applications, or information associated with the notification. Furthermore, advertisements, special backgrounds and/or other branding information (from the source) can be displayed in the notification window, when a notification is rendered.

In another aspect, notifications with active durations, and/or with expiration dates, can be removed from an active queue after the date has passed. Notifications in a journal can be listed as expired if users are interested in seeing the history of this kind of activity.

In addition, classes of notification can be tagged as being intrinsically replaceable by any update of information as identified by a Globally Unique Identifier (GUID), for example, in order to provide an update on the world state of information that the notification is reporting.

User Interface tools can be provided that enables users to append priority information to messages, or, more simply to do a normal Send or a When Free send. A When Free send would be ported through the bounded deferral system described above; a normal send can act as a non-bounded communication. Notifications can also be tagged with application-specific (or life-specific) contexts from a set of contexts (e.g., MS Word at focus, MS Outlook at focus, etc.) and render the notifications within the active context if it has not expired. For example, an assistance tip about a word processor usage rendered via a notification system should generally be provided when the word processor is at focus. If the application is not at focus, the tip should simply be journaled.

More advanced features can also be provided. For example, a frequency of "likely available times" for a user can be observed and learned, when users are working at a desktop or using an endpoint device, and the frequency with which alerts are received by the user in each class, and infer the expected time until the next likely free state, from a user's activity (based on application, time of day, expected user location, etc.). This information can be employed to automatically set the max deferral times for a respective notification priority class so as to enable the notification system to bound the probability of being disturbed for each priority class of alerts. This can be set by default, or can enable users to specify a probability for each priority class, and thus, inform the system that they do not want to be disturbed (that is, alerted when busy) for more than say, 5% of the time for low priority alerts and more than 10% of the time normal priority alerts, and 25% of the time for high priority alerts, etc. That is, users can specify a target "tolerated probability" of disruption for a respective priority class and the system can set the max deferral times for the classes.

Confirmation can be received that important notifications have been observed, for example, a convention can be employed that hovering over a notification is a signal that "I got it," and utilize this feedback as an option that a user can turn in via a profile. That is, users can opt to turn on the option:

[ ] Continue to notify me about critical information every [x] minutes until I confirm with a mouse over or keystroke on an endpoint device.

When a user has been away from a desktop device for more than x minutes (set as default or by user specified amount of time), desktop events can be deferred, and instead notifications can be sent to a mobile or endpoint device. Similar max deferral times can be employed as specified for desktop alerting, or instead access an alternate set of max deferral times for the "away" condition. That is, another table or function for controlling the max deferral time for the away situation can be employed.

Similar to the desktop situation, the user's calendar can be accessed for uninterruptible meetings, such as presentations, or other meetings that should not be interrupted except for notifications that are marked as immediate pass through. Similar generalizations per the calendar as described above in the desktop setting can be employed, such as utilizing information a respective manner that is provided in desktop settings or have special generalizations for the mobile or endpoint settings.

In another aspect, set time of day constraints can be provided to restrict notifications during certain times (e.g., late at night and early morning, weekends). Users can specify classes of alerts they will receive to certain times. For example, all business related email and stock information will not be sent to a mobile device on weekends.

Messages sent to a cell phone or pager can be journaled by a notification manager and available when the user returns to the desktop in a notification journal view—or accesses a journal view on the mobile or endpoint device. Similar chunking of alerts can be employed for the mobile setting as for the desktop, described above.

Mobile or endpoint devices such as embedded auto personal computers (AutoPCs) and appropriately instrumented hand-held personal computers (HPCs) (i.e., that have accelerometers) can be employed with the present invention. For these devices, presence information is used to infer they are active based on touch and/or acceleration, for example. A list of likely free states is created for some significant and/or distinct mobile settings (e.g., a set of states each for the case of driving and for walking). For example, for driving, free states can include "just stopped at a red light or other stop and there's no conversation," or "cruising at a relatively constant velocity," for example.

Other systems can also consider different levels of attention (e.g., considering speed, complexity of breaking, steering, etc.) For HPC's, it can be inferred (e.g., Bayesian inference) with accelerometers that a user is in a car, and infer similar distinctions without direct feeds from an onboard automobile computer. For HPC's, it can be detected when devices have just been picked up, when walking or running has just ceased, or conversation has ceased, or when the unit has just been placed down to rest. For such mobile or endpoint devices, notifications can be cached locally and rendered per likely free states. If there are no detectable two-way connections, such information can be provided in a journal such as a desktop Notification Journal as having been sent to the mobile device. It is to be appreciated that a Notification Journal can also be maintained by the endpoint device.

Users can configure the notification system so that when a user first returns to a desktop (or laptop device) after an "away state" has been detected, a single notification can be relayed, the mobile notification journal, and enable users to select particular items to view the notification that would have been observed if the user had been at the desktop. For example, users may not have a mobile device, or not have the mobile device in service, or desire to simply specify that the notification system to work in a "desktop only" modality. In this case, the following can be performed:

When the notification system notes that a user has transitioned from a "user away" to a "user present at desktop device," users are presented with a notification journal for all notifications that have gone over the max deferral time while they were away—or, per a user's preferences, foregoing the max deferral time and post all alerts to such a journal (e.g., sorted in a variety of ways per user preferences, by message class, by priority, or by date, or such combinations as message class containing the highest urgency alert, sorted within class by priority or by time, etc.). When the user is detected to be away, notifications can additionally continue to post on the desktop (e.g., in a pre-assigned area) a notification journal and continue to populate the journal (and sort by priority or by time of notification) with notifications that have gone over their max deferral time—or, alternatively foregoing the max deferral time and post substantially all alerts to such a journal. When such a journal is present, the user can be alerted with an audio cue—upon return or log in—that a journal is waiting for them. The display suppressed and rendered as an audio cue upon return and have the user take action to bring up the journal. In settings where users have been utilizing a mobile device, a journal can automatically remove journal items from the desktop journal when they are sent to the mobile device, or mark the notifications as having been transmitted to the mobile device, in order that users can sort and/or quickly scan for items they have not yet observed. Rather than posting a journal, a decision can be made to display a notification journal, chunked alerts (per the chunking policy mentioned above), or a single alert, depending on the quantity of journaled items.

Additionally, users can be enabled to specify that the notification system delay such a "display upon return" policy, and allow users to get to work when they return (to avoid the frustration with being hit by alerts when they desire to return and get something done), and/or wait for the next "likely free" state to appear. A special "pass through" can be provided for notifications immune to such suppression. For such a functionality, additional "likely free" state to be can be defined as: "user away and returns and does not begin active work with an application or with the system." That is, it can be detected if users, upon returning to their desktop or endpoint device, begin work right away, and instead, wait until a "likely available" state is reached. If the user returns and does not begin work, this new likely free state is noted and thus causing a display of the notifications that are pending. If the user returns and is busy, the system can display notifications that have exceeded their max deferral, or, per user preference, display nothing until the next "likely free" state appears. At this time, the journal, chunked alerts, or single alerts are displayed to the user, depending on the quantity of journaled items.

Users employing a mobile or endpoint device may have the device turned off or be in a region without service. Turning on the cell phone may eventually work in a similar manner as returning to a desktop. That is, a journal view of unseen alerts may appear and users can browse and bring up respective alerts. Other aspects of the present invention can enable desktop journals to be updated when messages are reviewed on a mobile device, for example.

Figure 3:
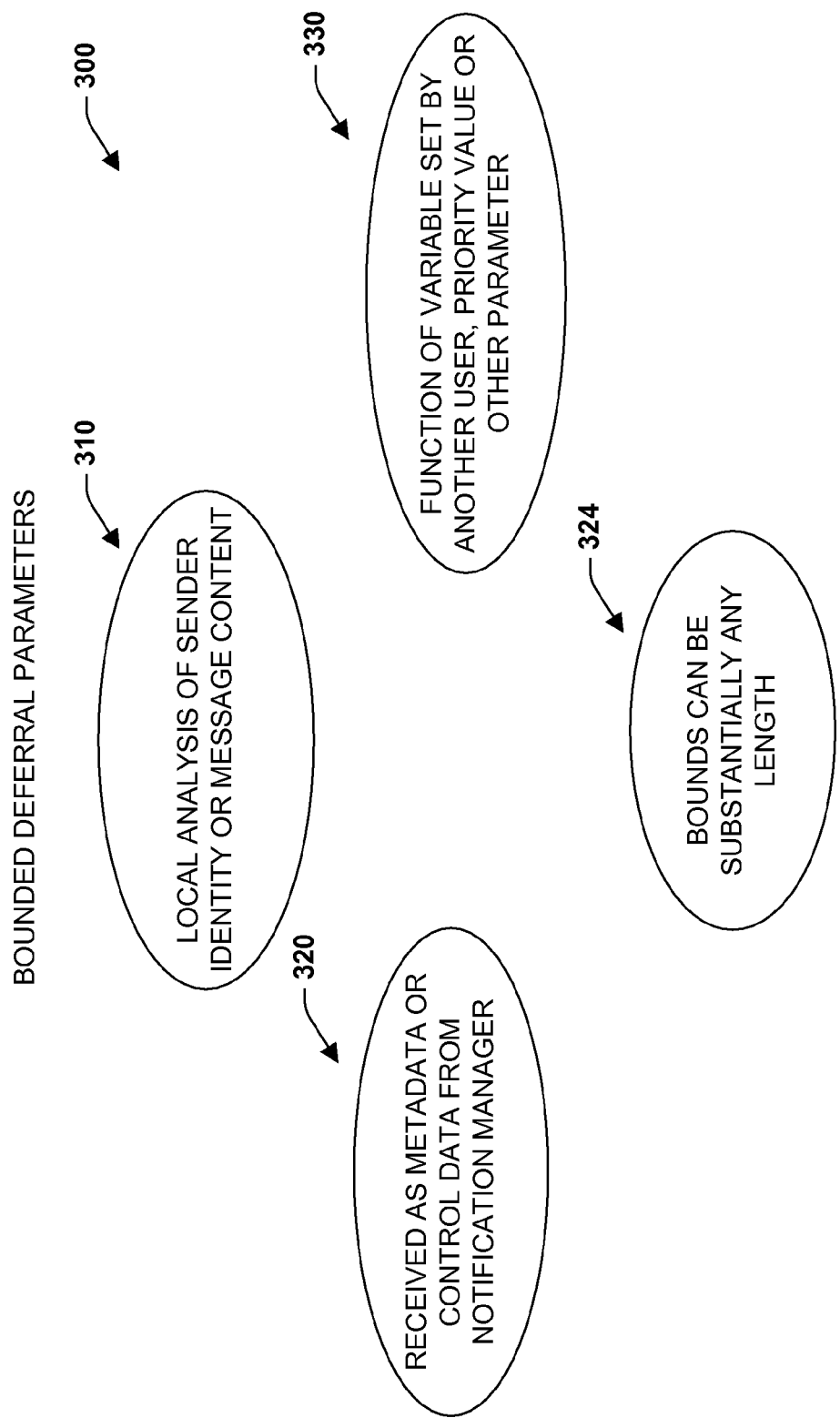
FIG. 3 is a diagram illustrating exemplary bounded deferral parameters in accordance with an aspect of the present invention.

Turning to FIG. 3, a diagram 300 illustrates exemplary bounded deferral parameters in accordance with an aspect of the present invention. At 310, parameters on bounded deferral can be locally computed or determined based on local analysis of identity of a sender or nature of message content. At 320, these parameters can be received as part of metadata or control data from a central notification manager (i.e., the bounded deferral or recommended bounded deferral can be included in a notification schema of the message). At 324, deferral parameters can be a simple function of a variable set by another user (e.g., a priority flag set by message sender to indicate urgency of message) or a function of a priority value or other parameter set by a notification manager. At 330, parameters can include bounds that are substantial—just wait for a good time, and/or erase or log if too late (over some deadline for expiration).

Figure 4:
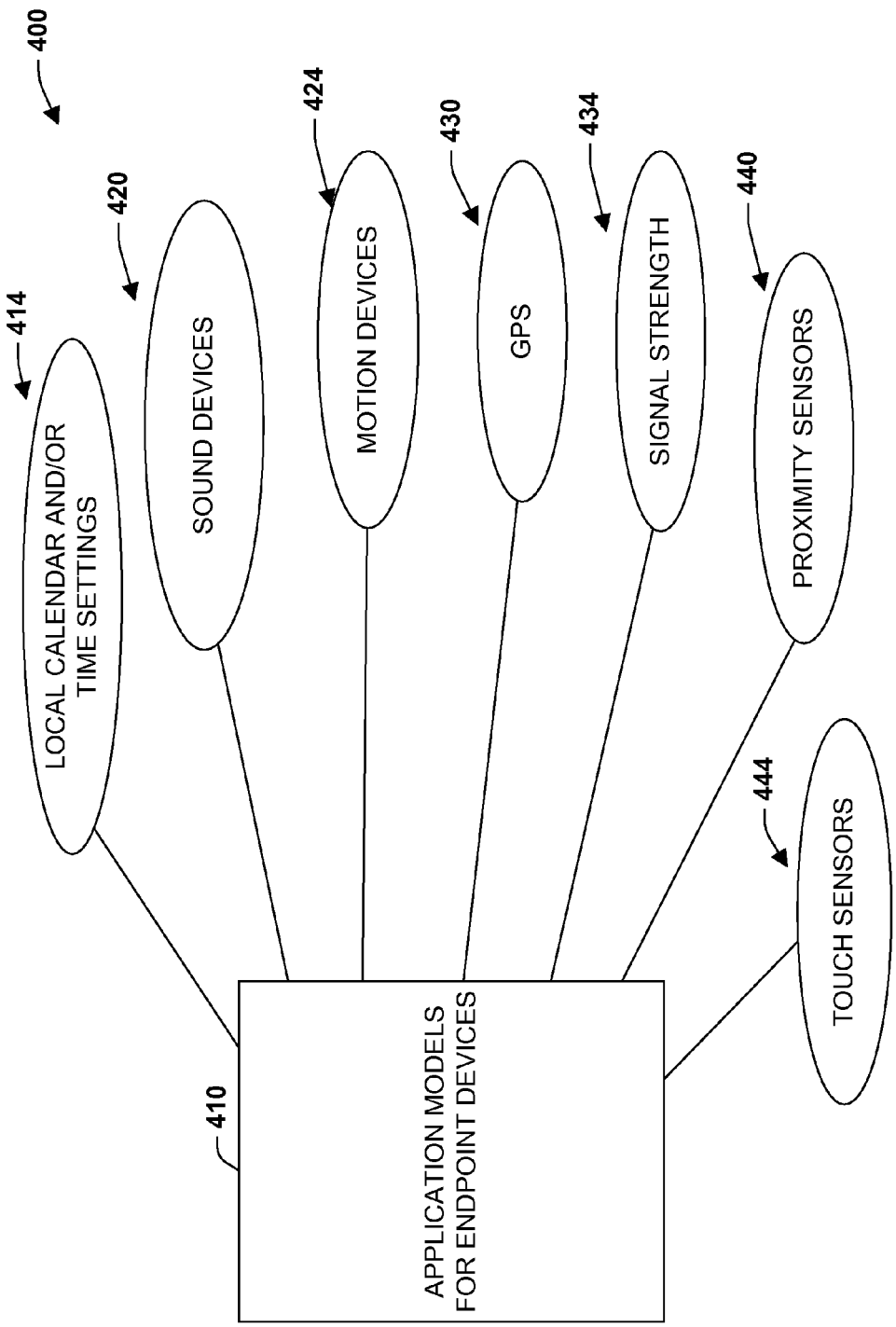
FIG. 4 is a diagram illustrating application models for endpoint devices in accordance with an aspect of the present invention.

Referring now to FIG. 4, a system 400 illustrates various application models 410 for endpoint devices in accordance with an aspect of the present invention. The application models 410 describe some example sensing components that can be employed by endpoint devices. Sample applications 410 include use of local calendar information at 414 to guide a device to hold alerts until after a movie or show, or other meeting has ended. At 420, microphones or other sound receptors can be employed to sense when someone has stopped speaking, or other loud background noise, e.g., car driving noise, car radio, etc.—attempt to defer alert until a period of quiet greater that t within a bound. At 424, motion devices such as accelerometers sense when a car has stopped, e.g., at a red light or stop sign for an alert to be rendered, e.g., within a bound; person has stopped walking, talking, etc.

In one example, applications consider the notion of ringing after bound is reached and then again as backup after quiet, etc. or other sensor condition. Another case waits until a person is in proximity or has touched a device before delivering a notification. Application models 410 can also consider automated deferral of phone In a simple case: Silence first few when rings quiet, while waiting for speech to stop. A more elaborate case employs an agent picking up a phone if a user is sensed to be temporarily busy and asking the user to hold on for just a bit (the bounded deferral for a call), then buzzing through when either user has stopped speaking or the bound has been reached, (e.g., a minute) . . . coupling this, with, "please hold on for just another 30 seconds. still trying." If this fails, directing callers to an answering machine or piping the caller through to the user. This concept can be coupled with performing phone ringing deferral only for special people or people within specially indicated groups ("People I am meeting with in an hour, etc.") Other sensors that may be employed by endpoint devices include Global Positioning Systems (GPS) at 430, 802.11 signal strength sensors at 434, infrared proximity sensors at 440, and touch sensors at 444.

Figure 5:
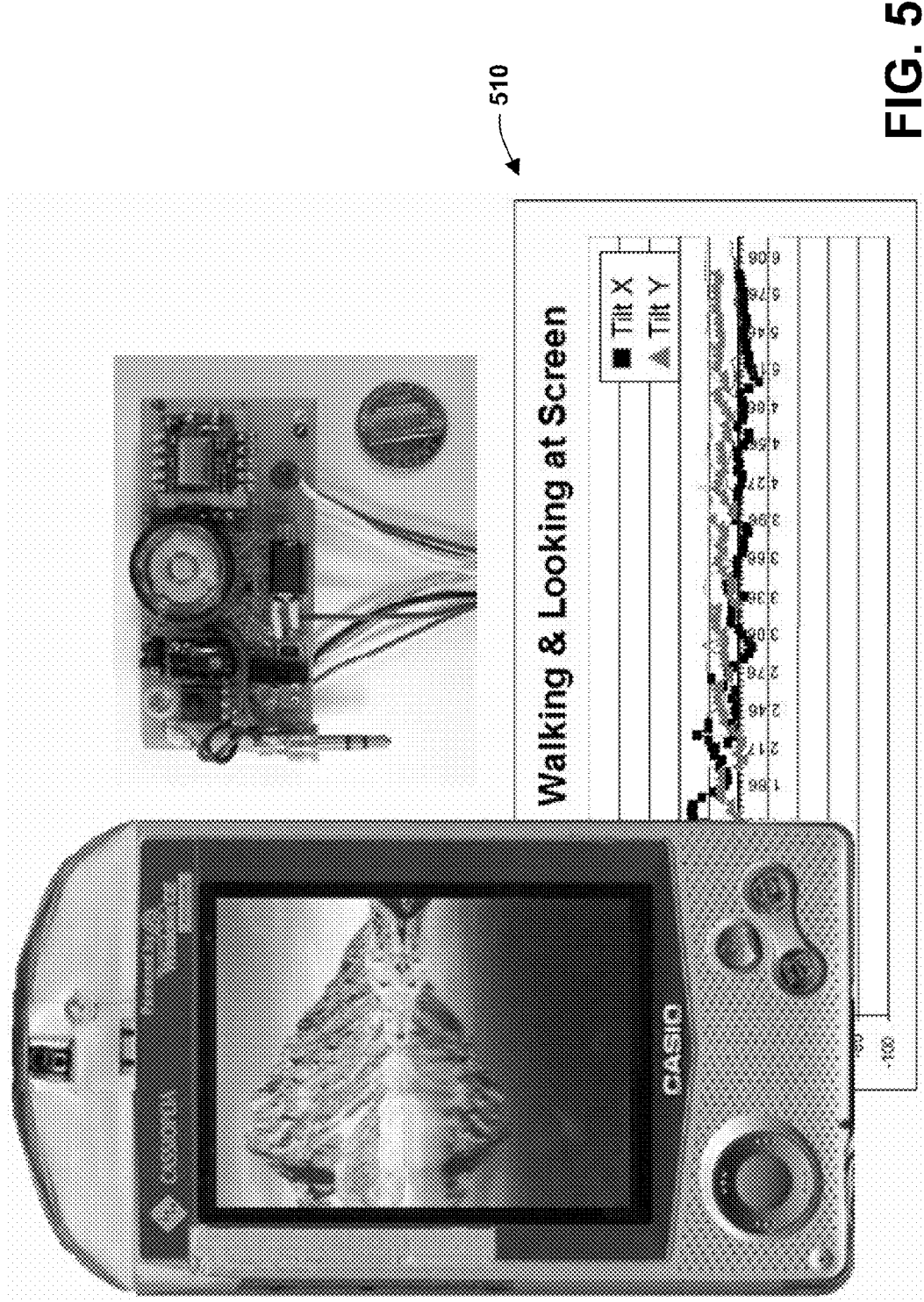
FIG. 5 illustrates an example endpoint device in accordance with an aspect of the present invention.

FIG. 5 illustrates an example endpoint device 500 in accordance with an aspect of the present invention. The endpoint device 500 includes a sensing personal digital assistant (PDA), outfitted with multiple perceptual sensors, including proximity, motion, and touch sensors. In the background at 510, accelerometer signals are displayed showing a motion fingerprint of a user walking while looking at the device 500.

As highlighted in FIG. 5, small devices can be made aware of the attentional status and location of users—and transmitting local sensor information to inform a central Notification Manager, performing entirely local notification management and related services based on observations, and/or performing a combination of central and local deliberation about notification. In the latter case, the central Notification Manager makes general decisions about routing, and relies on the endpoint device to perform precision targeting of the timing and alerting modality, based on local sensing and reasoning.

As an example, with the use of bounded deferral policies, a local device commits to relaying a message that it has received before a message-specific deadline is reached; the device attempts its best to determine a suitable time for interruption within an allotted period. As noted above, the endpoint devices may embed and leverage multiple perceptual sensors on small devices, including GPS, 802.11 signal strength, accelerometers, infrared proximity detectors, and touch sensors, for example. Other aspects can exploit opportunities for developing devices, such as situation at hand, including states derived from coarse models of attention.

Figure 6:
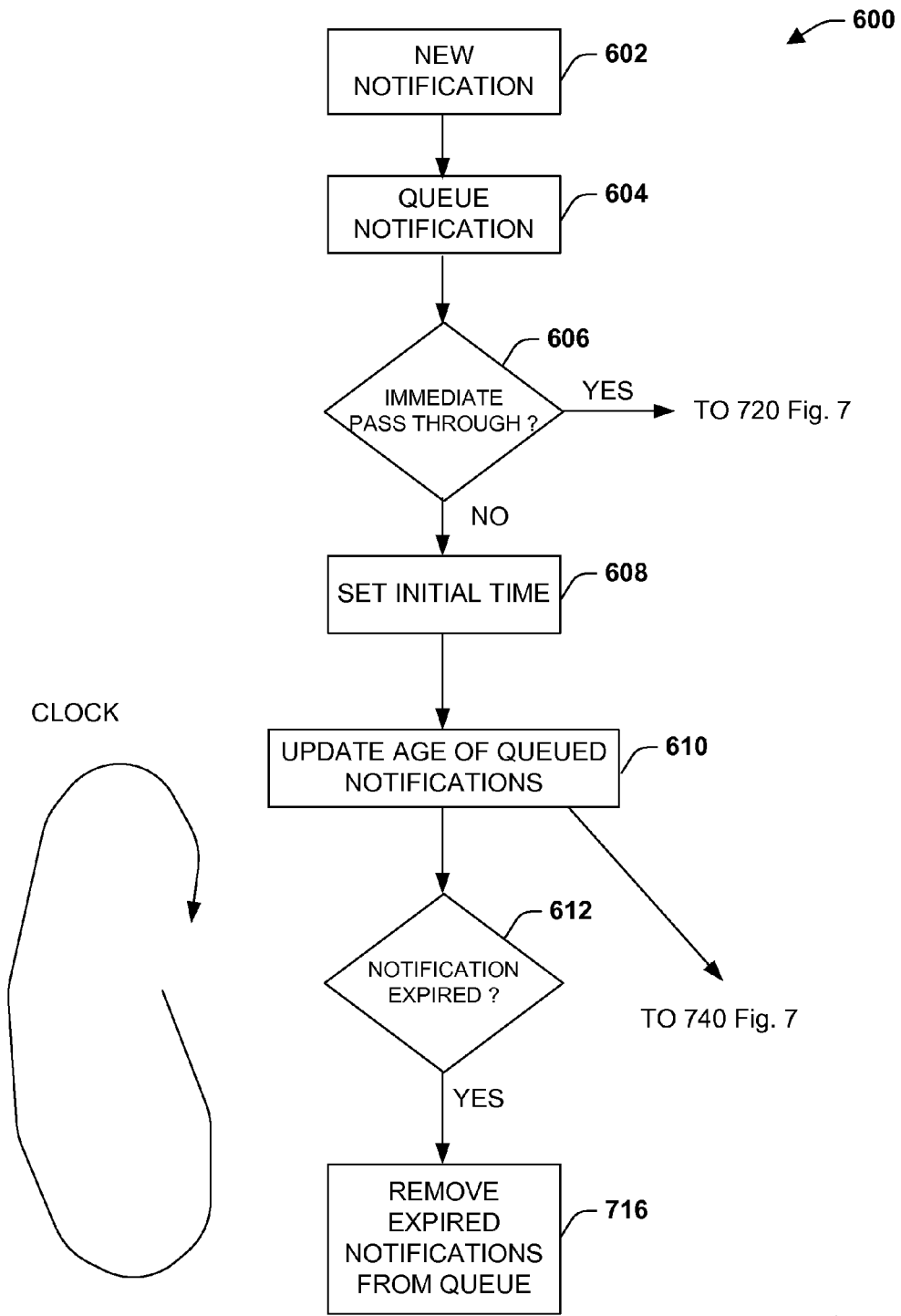
FIGS. 6 and 7 are flow diagrams illustrating bounded deferral processing in accordance with an aspect of the present invention.
Figure 7:
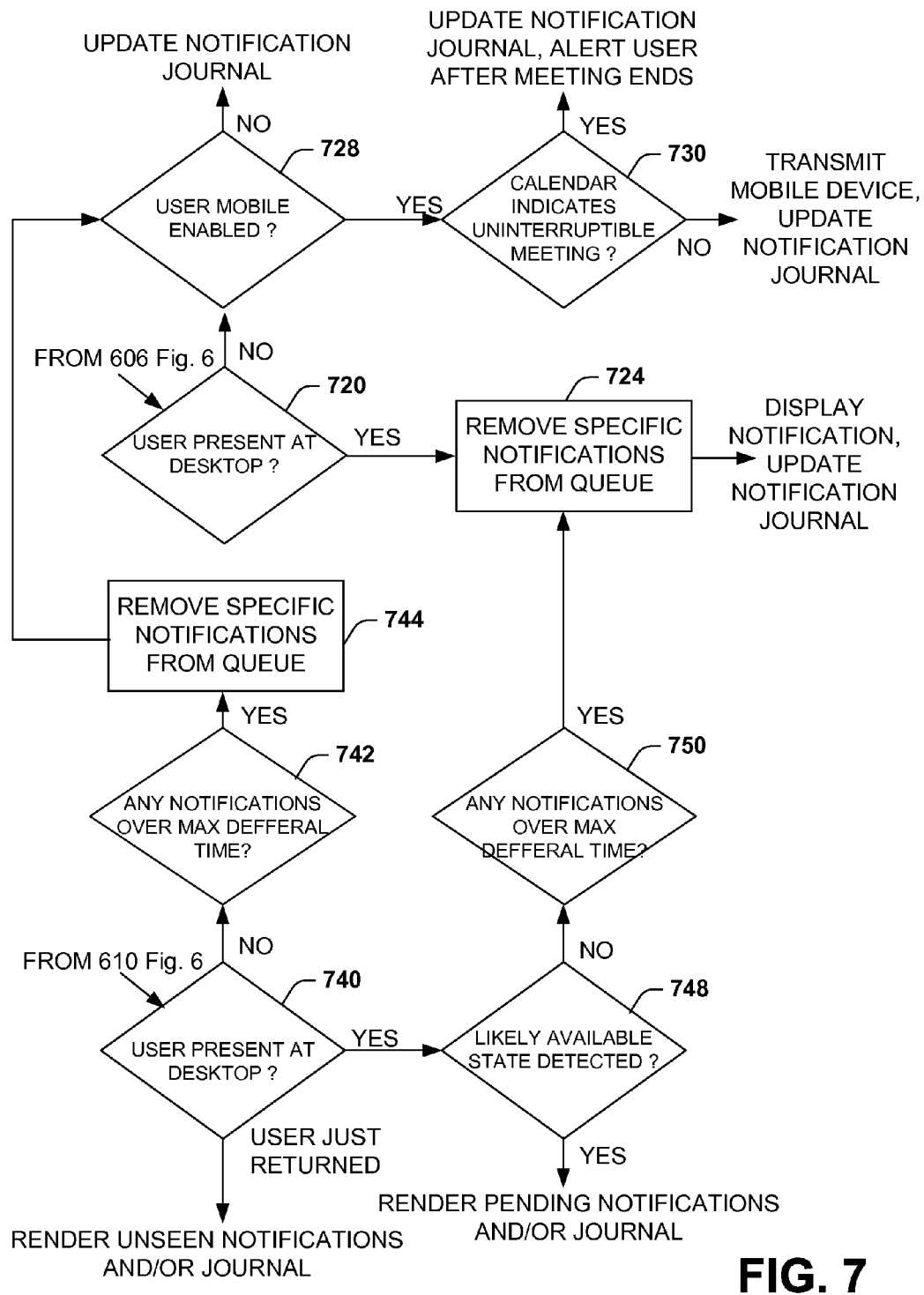

FIGS. 6 and 7 illustrate methodologies for providing bounded deferral notifications in accordance the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 6, a new notification is received at 602. At 604 the received notification is placed onto a message queue. At 606, a determination is made as to whether the received notification should be immediately passed through to the user. This can be achieved by observing a setting such as a flag indicating whether the notification should be passed through. If the notification should be passed through, the process proceeds to 720 depicted in FIG. 7. If the notification should not be passed through, the process proceeds to 608. At 608, an initial time is associated with the notification such as a max deferral time described above. It is noted that acts 610, 612 and 616 can be executed as part of a clocked service routine or as an interrupt event, wherein these acts are periodically executed from portions of the process depicted in FIGS. 6 and 7. At 610, the age of queued notifications are updated. At 612, a determination is made as to whether a notification has expired. If so, the expired notification is removed from the queue. If notifications have not expired at 612, the process returns/proceeds to the process depicted in FIG. 7.

Referring now to FIG. 7, a decision is made at 720 regarding the branch from 606 of FIG. 6. At 720, a determination is made as to whether the user is at the desktop or endpoint device. If so, the process proceeds to 724 wherein the specific notification is removed from the queue, the notification is displayed, and a notification journal is updated. If the user is not present at the desktop at 720, a determination is made at 728 whether a user mobile or endpoint device is enabled. If not, the process updates the notification journal. If the mobile device is enabled at 728, the process proceeds to 730. At 730, a determination is made as to whether a calendar indicates an uninterruptible meeting. If so, the notification journal is updated and the user is alerted after the meeting. If such a meeting is not in place at 730, the notification is transmitted to the mobile device or endpoint device and the notification journal is updated.

Referring to 740, a return is provided from the acts of 610-616 depicted in FIG. 6. At 740, a determination is made as to whether the user is present at the desktop or endpoint device. If so, a determination is made at 742 as to whether any notifications have reached the max deferral time set at 608 of FIG. 6. If so, the process proceeds to 744 and removes the specific notification from the queue and proceeds to 728 which has previously been described. At 740, if the user has just returned to the desktop or endpoint device, unseen notifications are rendered and the notification journal is updated. If the user has been at the desktop at 740, the process proceeds to 748. At 748 a determination is made as to whether any likely available states have been detected. If so, pending notifications are rendered and the notification journal is updated. If a likely available state has not been detected at 748, the process proceeds to 750. At 750, a determination is made as to whether any notifications have reached the max deferral time set at 608 of FIG. 6. If so, the process proceeds to 724 and removes the specific notification from the queue and proceeds to display the notification and update the notification journal.

FIGS. 8-14 described various aspects of notification processing and attentional modeling. As noted above, the present invention considers how systems may access and use information about a user's attention. Subtle clues about attention are often available, and a number of these clues can be taken as direct signals about the attentional status of users. For example, sensing patterns of simple gestures such as the touching and lifting of a device in different settings can relay evidence about attention that can be exploited in a number of exciting ways. Moving to higher-precision sensing, the present invention can employ the use of gaze-tracking systems, and signals about the focus of visual attention in a variety of applications. As gaze sensors grow in reliability and decrease in cost, various devices can be utilized that recognize when and how they are interrogated by the spotlight of visual attention.

Nonetheless, there often is uncertainty about a user's attentional focus and workload in light of observations, and about the value of alternate actions in different contexts. Thus, the present invention employs models that can be harnessed to reason about a user's attention and about the ideal attention-sensitive actions to take under uncertainty. Such models and reasoning can unleash new functionalities and user experiences. In some cases, models can be constructed by hand and/or learned from data Bayesian models that can be viewed as performing the task of an automated "attentional detector," working to reveal current or future attention under uncertainty from an ongoing stream of clues. Bayesian attentional models take as inputs sensors that provide streams of evidence about attention and provide a means for computing probability distributions over a user's attention and intentions.

Figure 8:
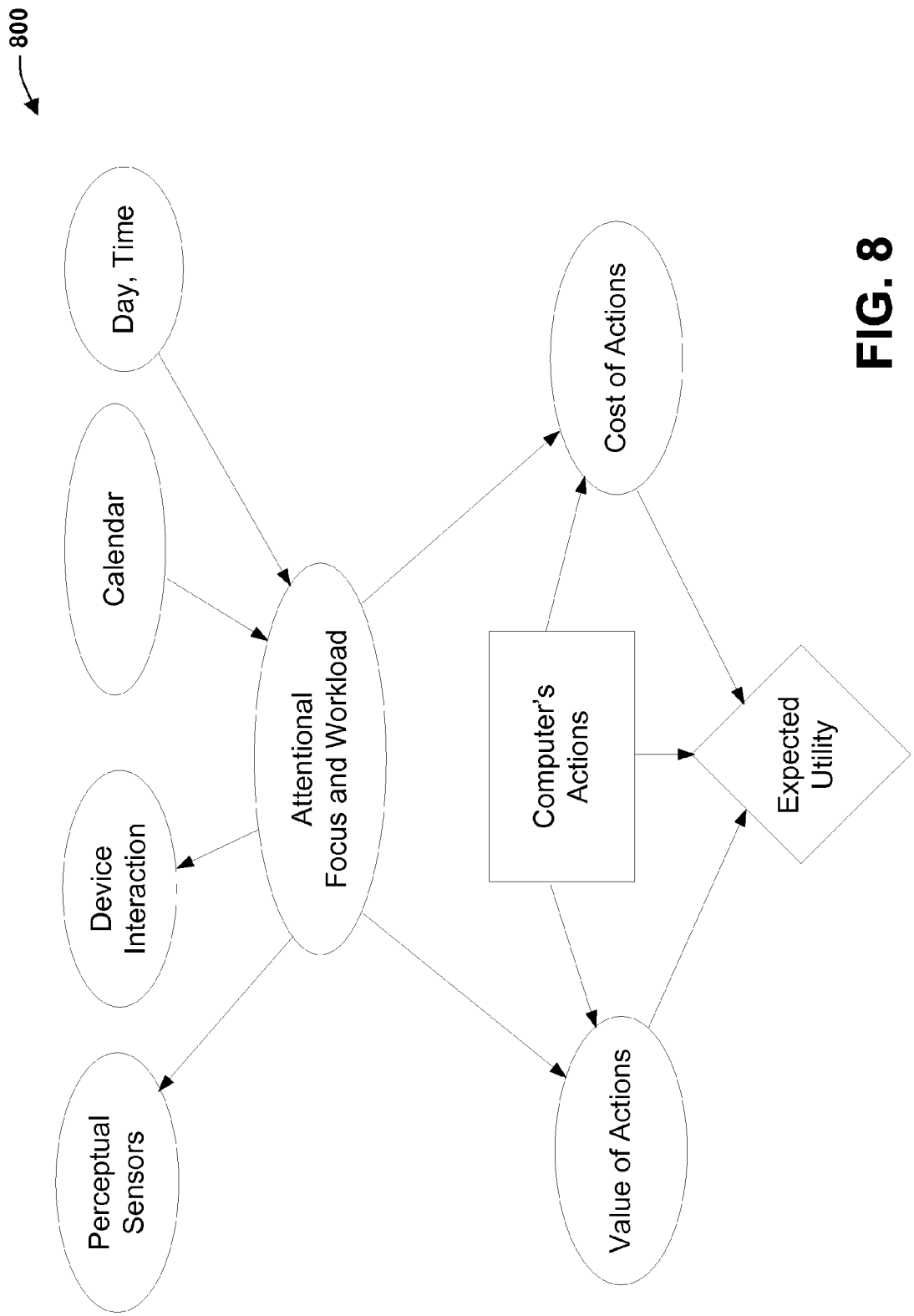
FIG. 8 is an influence diagram illustrating a model of attentional focus and workload in accordance with an aspect of the present invention.

FIG. 8 is a high-level decision model 800 considering a user's attentional focus and workload as a random variable, influenced by the observed states of several sensors.

Perceptual sensors include microphones listening for ambient acoustical information or utterances, cameras supporting visual analysis of a user's gaze or pose, accelerometers that detect patterns of motion of devices, and location sensing via GPS and analysis of wireless signals. However, more traditional sources of events can also offer valuable clues. These sources include a user's online calendar and considerations of the day of week and time of day. Another rich stream of evidence can be harvested by monitoring a user's interactions with software and devices. Finally, background information about the history of a user's interests and prior patterns of activities and attention can provide valuable sources of information about attention.

To build probabilistic attentional models 800 with the ability to fuse evidence from multiple sensors, the present invention leverages representations for reasoning and decision making under uncertainty. Such work has led to inferential methods and representations including Bayesian networks and influence diagrams-graphical models that extend probabilistic inference to considerations of actions under uncertainty. Algorithms can be developed which enable computing probability distributions over outcomes and expected utilities of actions from these graphical representations.

FIG. 8 displays a high-level influence diagram representing sensor fusion and decision making in the context of a user's attention under uncertainty. As portrayed in the figure, a set of variables (oval nodes) representing sensed evidence influence a random variable representing a user's attentional status which, in turn, influences the expected value of alternate actions or configurations. Intermediate cost and benefit variables can be introduced with different outcomes. Decisions (rectangular node) about ideal computer actions take into consideration the costs and benefits, given uncertainty about a user's attention. In the end, an expected utility (diamond-shaped node) is influenced by the action and the costs and benefits.

A high-level, pedagogical view can be extended by constructing richer models that contain additional intermediate variables and key interdependencies among the variables. Also, as both devices and people are immersed in time, the present invention goes beyond point-wise considerations of the states of variables, to build higher-fidelity temporal attentional models that represent changing observations and beliefs with the flow of time. This can include dynamic Bayesian networks and Hidden Markov Models for representing and reasoning about states of attention and location over time.

FIG. 9 illustrates a temporal Bayesian attentional model 900, highlighting key dependencies (dashed arcs) between variables in adjacent time slices. The model 900 displays two adjacent time slices of a temporal attentional model. Such a model provides a probability distribution over a user's workload and task that was developed for an application that provides selective filtering of messages and communications to users.

In this case, the status of attention includes approximately 15 discrete states (can include more or less states).

Figure 10:
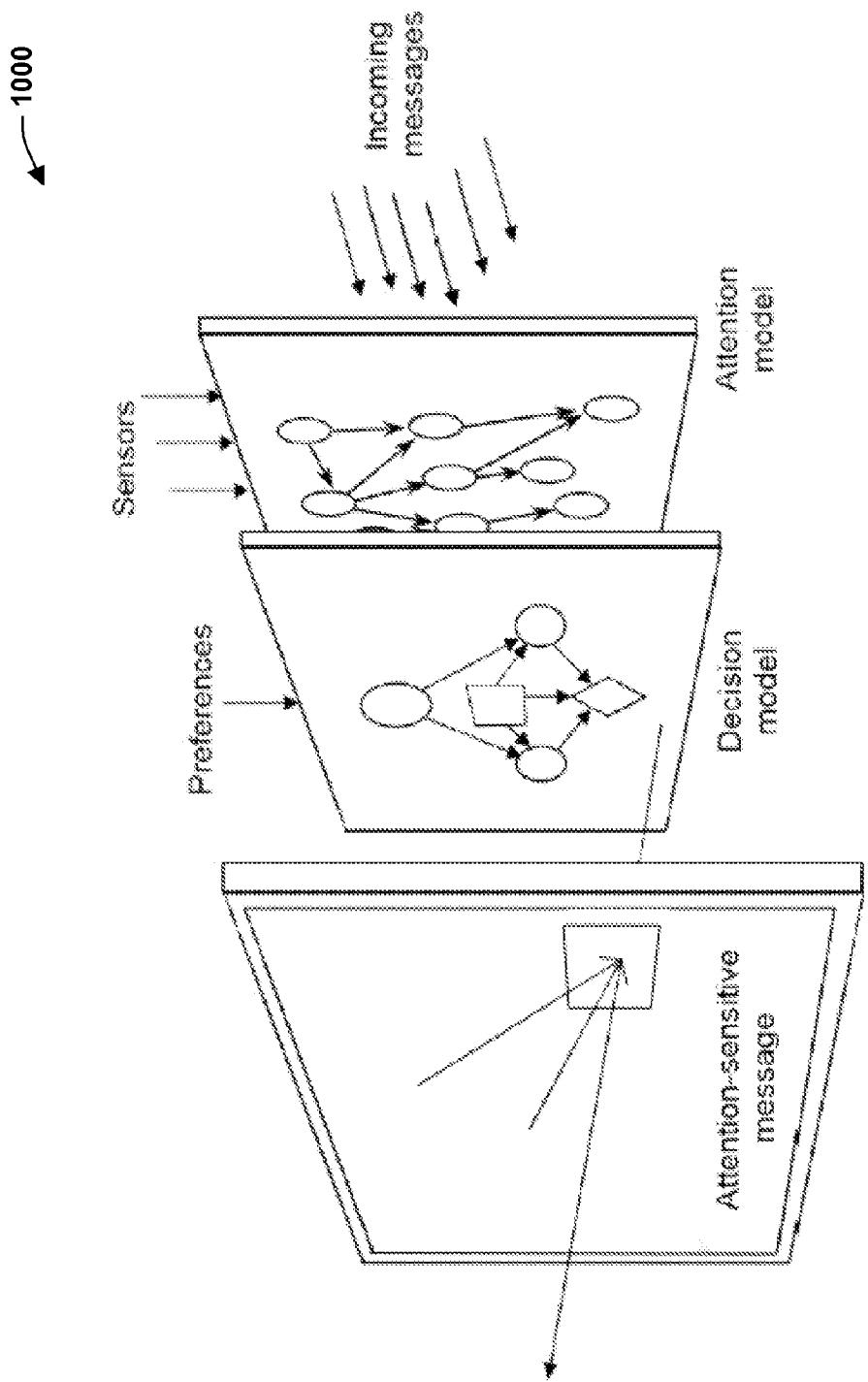
FIG. 10 is a conceptual overview of a notification platform in accordance with an aspect of the present invention.

FIG. 10 depicts a conceptual overview of a Notification Platform 1000, a cross-device messaging system that balances the costs of disruption with the value of information from multiple message sources. The system employs a probabilistic model of attention and executes ongoing decision analyses about ideal alerting, fidelity, and routing. In some cases, the Notification Platform 1000 has centered on formulating economic principles of attention-sensitive notification—and on implementing a cross-device alerting system based on these principles.

The Notification Platform 1000 modulates the flow of messages from multiple sources to devices by performing ongoing decision analyses. These analyses balance the expected value of information with the attention-sensitive costs of disruption. As highlighted in FIG. 10, the system 1000 serves as an attention-savvy layer between incoming messages and a user, taking as inputs sensors that provide information about a user's attention, location, and overall situation.

The design of the Notification Platform was informed by several earlier prototypes exploiting context-sensing for identifying a user's workload, including an automated prioritization system (See FIGS. 14 and 15 below). Prioritization systems employ rules or statistical classifiers that assign values of urgency to incoming email or other messages. The classifiers are trained with sample messages, either obtained via explicit training or by automatically drafting data sets by observing a user's interaction with an email browser or other system. Prioritization systems may include components that also observe a user's patterns of presence at a desktop computer based on time of day, and infers the time until a user will review unread messages. The system computes an expected cost of delayed review for incoming sensing and calendar information, in automated decisions about if and how to alert and transmit information to a user about email, tasks, and appointment reminders in mobile and desktop settings.

Figure 11:
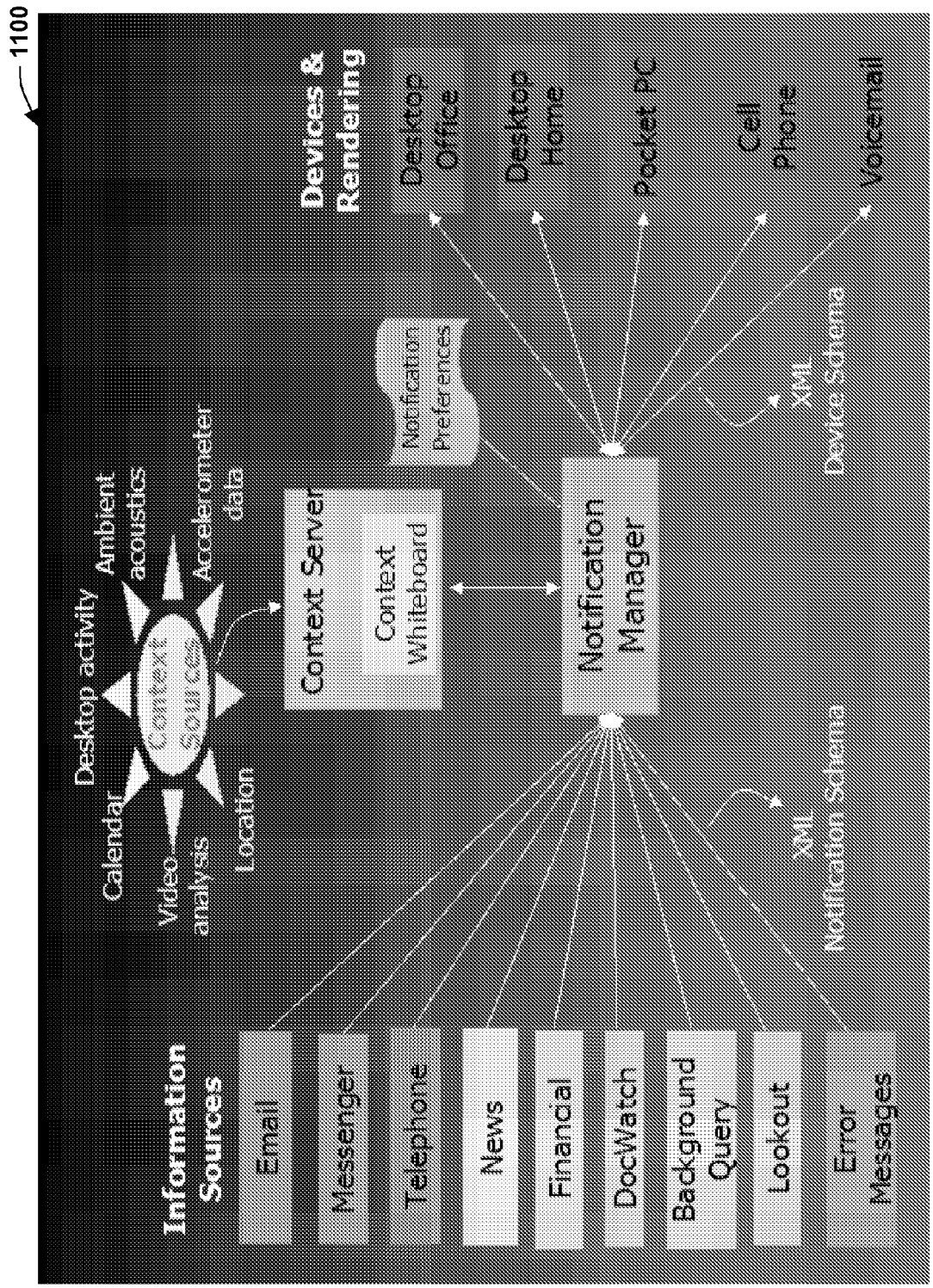
FIG. 11 is a schematic diagram illustrating notification platform in accordance with an aspect of the present invention.

FIG. 11 illustrates an exemplary constellation of components of a Notification Platform 1100, depicting a subscription architecture. Subscribed sources and devices communicate with a Notification Manager via a set of standard interfaces. Sensor findings from multiple devices are considered in deliberations about information value, attention, and the best channel and alerting modality. The Notification Platform 1000 uses a decision-analytic model for cross-device alerting about information from multiple message sources. The analyses consider a user's attention and location under uncertainty, as well as the fidelity and relevance of potential communication channels. FIG. 11 displays a schematized view of the architecture of the Notification Platform 1000.

Standard interfaces and metadata schemas allow users to subscribe to different sources of information and devices to a Notification Manager. At the heart of the Notification Manager is a Bayesian attention model and decision analysis which accesses clues about attention and location from sensors via a module referred to as a Context Server. The Context Server accesses several states and streams of evidence, including a user's appointments from an electronic calendar (e.g., Microsoft Outlook), events about device presence and activity, an analysis of ambient acoustics in the room, and a visual analysis of pose using a Bayesian head-tracking system. Key abstractions from the evidence, such as "voice trace detected," posted to a volatile store called a Context Whiteboard which is periodically updated by incoming evidence. The Context Whiteboard is typically contacted for updated information every few seconds by the Bayesian attentional model in the Notification Manager.

The Notification Manager's decision analysis weighs the expected costs and benefits of alerting a user about messages coming into the system's Universal Inbox. In computing the costs of disruption, the decision model considers the probability distribution over a user's attentional state and location in several places in its analysis, including the cost of disruption associated with different alerts for respective devices, the availability of different devices, and the likelihood that the information will reach the user when alerted in a specific manner on a device.

The ongoing expected-utility analysis is performed in accordance with a user's preferences, stored in a profile. These include assertions about the cost of disruption for each alert modality, conditioned on the user being in different attentional states. As an example, for the case of a desktop computer, the system makes available a set of display alternatives as the product of different visual displays of the alert (e.g., thumbnail, full-display alert) and several auditory cues (e.g., no auditory clue, soft chime, louder herald). The placement of the alert with regards to the current focus of visual attention or interaction is also considered and processed.

Figure 12:
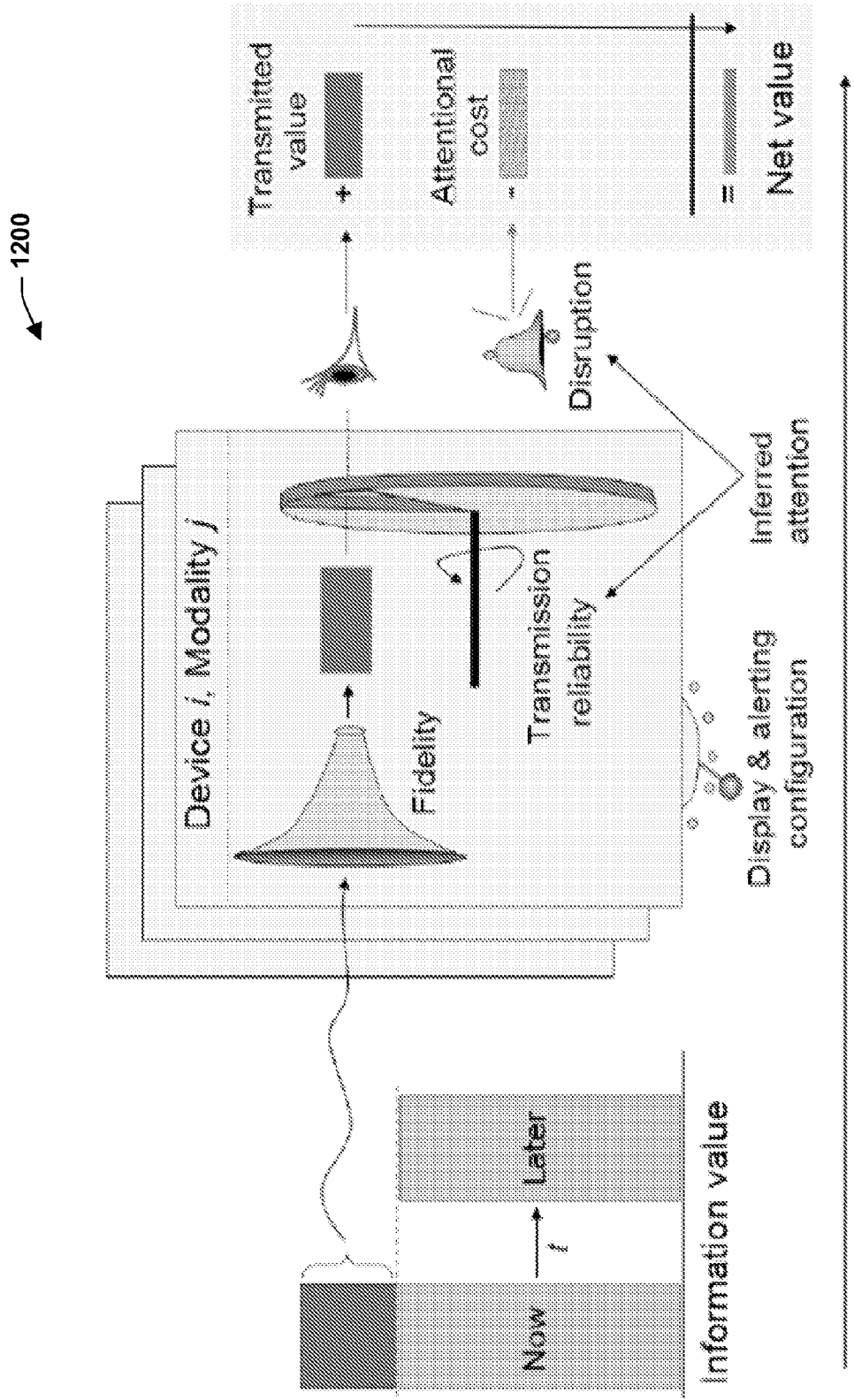
FIG. 12 is a diagram illustrating notification manager analysis in accordance with an aspect of the present invention.

FIG. 12 illustrates a graphical depiction 1200 of a Notification Manager's analyses. Attention-sensitive costs of disruption and the value of information are considered, along with the losses based in decreased fidelity (narrowing funnel) and transmission reliability (spinning slotted disk) associated with the use of each alerting modality of subscribed devices. With respect to transmission reliability (transrel) of an endpoint or source device, a scale can be provided (e.g., on 0-1) representing the probability p,p(transrel|context), that is the likelihood of getting through on the device given context, is a function, f(context) or f(sensed states).

FIG. 12 captures the deliberation of a Notification Platform about incoming messages. The system computes an expected value of receiving an alert as the difference between the value of alerting the user now and the value that will be obtained when the information is viewed later. Given probability distributions over a user's attention and location inferred from its sensors, Notification Platform iterates over alerting and display modalities for respective devices with an expected-utility analysis to decide if, when, and how to alert a user.

As represented with the metaphor of a narrowing funnel in FIG. 12, the system considers, for respective devices and modality, the loss in fidelity of information transmitted. In addition, the system considers the likelihood that an alert will be received, given inferred probability distributions over the attention and location of the user. This reliability of transmission is represented metaphorically in the figure as the chance that a message will make pass through a slot in a spinning disk. In the end, the attention-sensitive costs of disruption are subtracted from estimates of the value of alerting, yielding a net value of alerting a user for each channel and alerting modality. The channel and modality with the highest expected value is selected.

Figure 13:
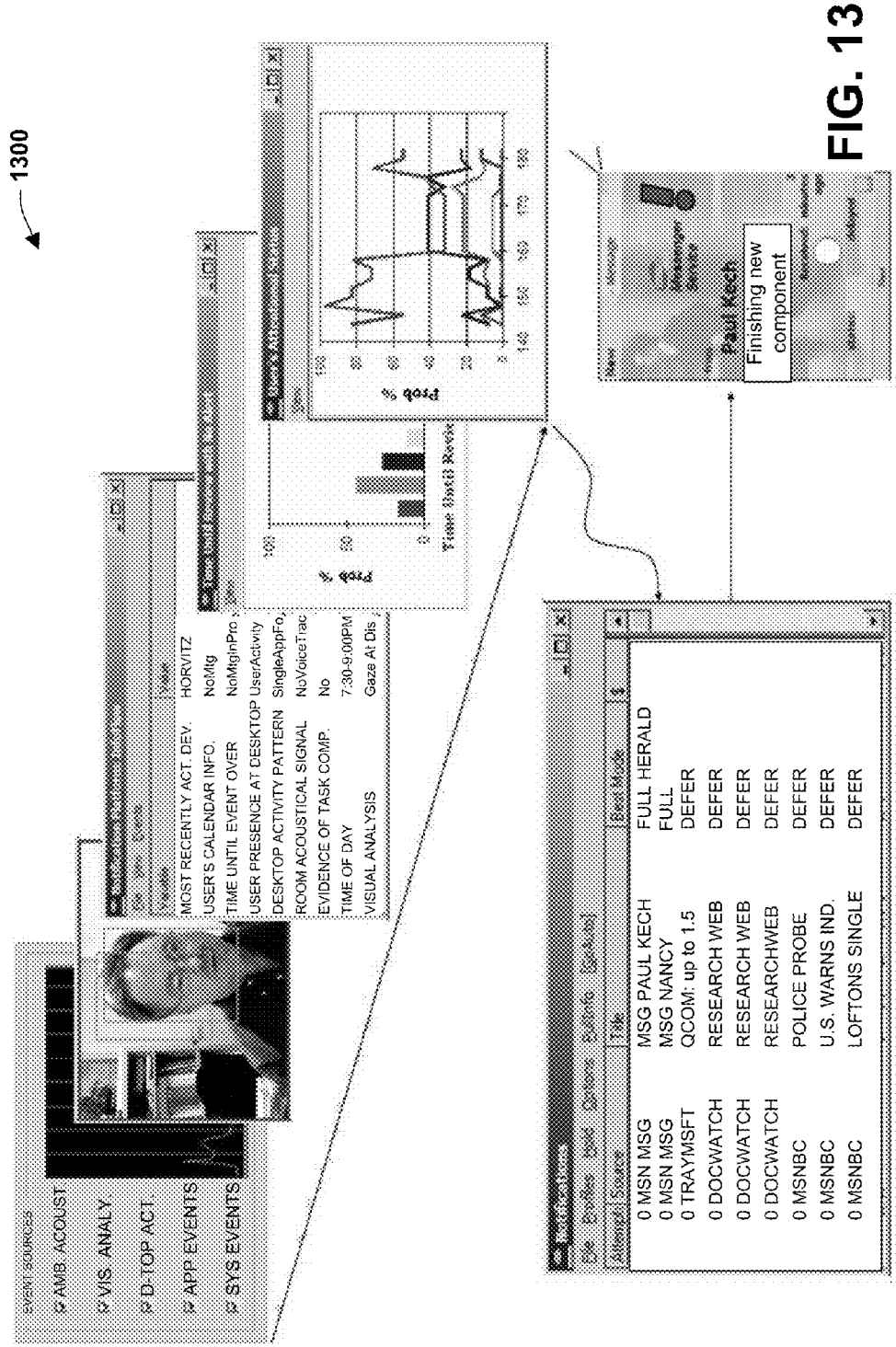
FIG. 13 is a diagram illustrating real time reasoning in a notification platform in accordance with an aspect of the present invention.

FIG. 13 illustrates a view 1300 of a portion of a Notification Platform's real-time reasoning capabilities. Information from multiple sensors is posted to a Context Whiteboard and fused to infer the user's attentional status and location. Multiple notifications are sorted by net expected value, a channel, and/or an alerting modality with the highest expected utility is selected.

FIG. 13 displays several aspects of the behind-the-scenes functioning of the Notification Platform. A context palette displays current findings drawn from sensor sources. Several views onto components of the decision analysis are displayed, including inference about the time-varying attention of the user. At the current time, the user is inferred to be most likely in a state named "high-focus solo activity," which has completed recently with "low-focus solo activity," "conversation in office," and other less likely states. A Universal Inbox displays messages from several sources, including email, instant messaging, breaking news, and stock prices. Messages have also been received from DocWatch, a file-scouting agent subscribed to by the user that identifies documents of interest for the user.

Respective messages are annotated with the best device and alerting policy, and the associated net expected dollar value of relaying the messages with that channel and mode is indicated. As portrayed in the inbox, it is worthwhile passing on to the user two instant messages. Other alerts are "in the red," as the cost of disruption dominates the net value of information. In this case, the ideal alerting mode and channel for an instant message is determined to be a visual notification in a large format coupled with an audio herald at the user's desktop system. Users can adjust sliders to change a set of predefined defaults on costs of interruptions. Another area centers on using machine learning for building probabilistic models of attention, location, and cost of disruption from data.

Figure 14:
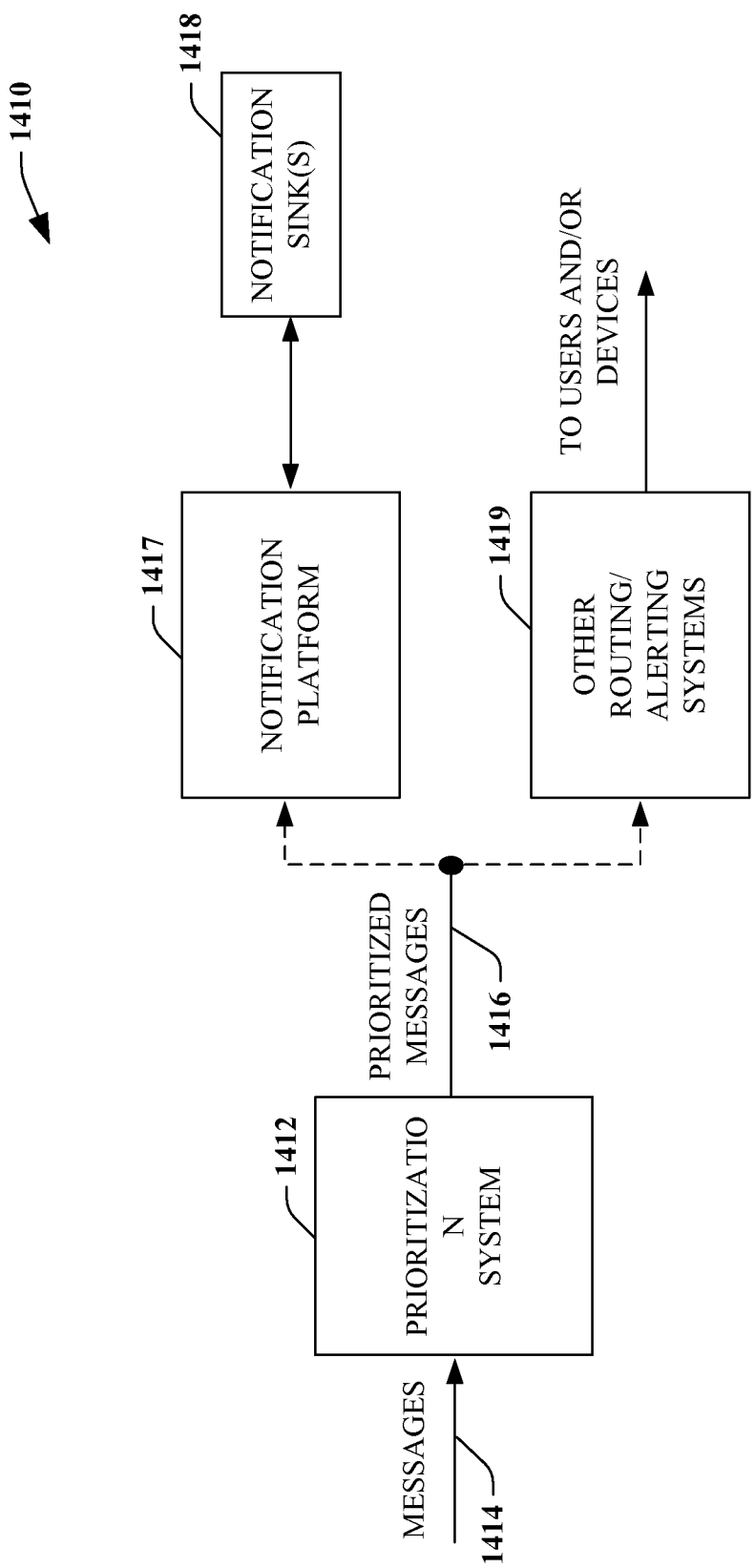
FIG. 14 is a schematic block diagram of a prioritization system in accordance with an aspect of the present invention.

Referring to FIG. 14, a system 1410 illustrates a prioritization system 1412 and notification architecture in accordance with an aspect of the present invention. The prioritization system 1412 receives one or more messages or notifications 1414, generates a priority or measure of importance (e.g., probability value that the message is of a high or low importance) for the associated message, and provides the one or more messages with an associated priority value at an output 1416. As will be described in more detail below, classifiers can be constructed and trained to automatically assign measures of prioritization to the messages 1414. For example, the output 1416 can be formatted such that messages are assigned a probability that the message belongs in a category of high, medium, low or other degree category of importance. The messages can be automatically sorted in an in box of an e-mail program (not shown), for example, according to the determined category of importance. The sorting can also include directing files to system folders having defined labels of importance. This can include having folders labeled with the degree of importance such as low, medium and high, wherein messages determined of a particular importance are sorted to the associated folder. Similarly, one or more audio sounds or visual displays (e.g., icon, symbol) can be adapted to alert the user that a message having a desired priority has been received (e.g., three beeps for high priority message, two beeps for medium, one beep for low, red or blinking alert symbol for high priority, green and non-blinking alert symbol indicating medium priority message has been received).

According to another aspect of the present invention, a notification platform 1417 can be employed in conjunction with the prioritization system 1412 to direct prioritized messages to one or more notification sinks accessible to users. As will be described in more detail below, the notification platform 1417 can be adapted to receive the prioritized messages 1416 and make decisions regarding when, where, and how to notify the user, for example. As an example, the notification platform 1417 can determine a communications modality (e.g., current notification sink 1418 of the user such as a cell phone, or Personal Digital Assistant (PDA)) and likely location and/or likely focus of attention of the user. If a high importance e-mail were received, for example, the notification platform 1417 can determine the users location/focus and direct/reformat the message to the notification sink 1418 associated with the user. If a lower priority message 1416 were received, the notification platform 1417 can be configured to leave the e-mail in the user's in-box for later review as desired, for example. As will be described in more detail below, other routing and/or alerting systems 1419 may be utilized to direct prioritized messages 1416 to users and/or other systems.

Figure 15:
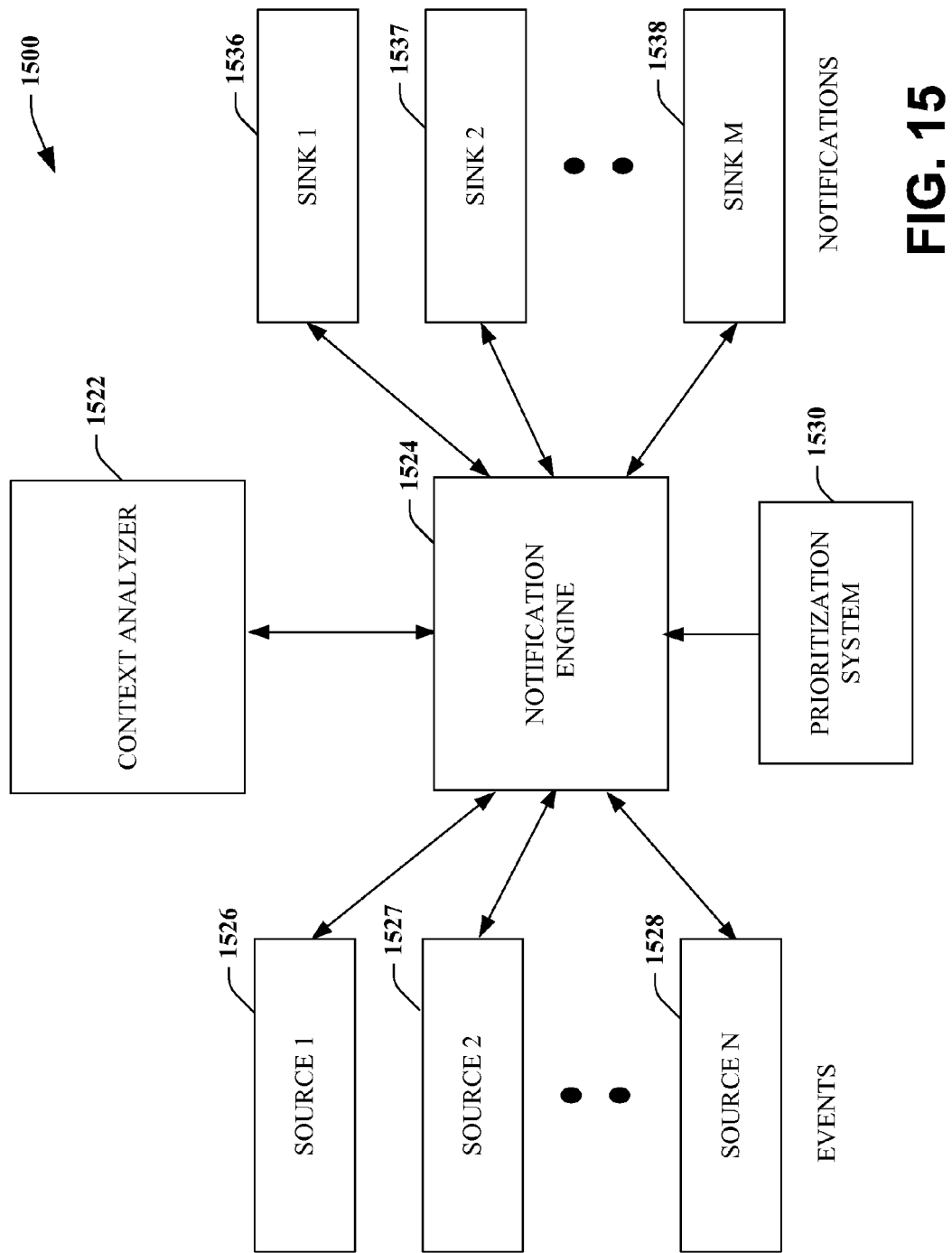
FIG. 15 is a schematic block diagram illustrating systematic cooperation between a notification engine and a context analyzer according to an aspect of the present invention.

Turning now to FIG. 15, a system 1500 illustrates how a notification engine and context analyzer function together according to an aspect of the present invention. The system 1500 includes a context analyzer 1522, a notification engine 1524, one or more notification sources 1 through N, 1526, 1527, 1528, a prioritization system 1530, which can operate as a notification source, and one or more notification sinks, 1 through M, 1536, 1537, 1538, wherein N an M are integers, respectively. The sources are also referred to as event publishers, while the sinks are also referred to as event subscribers. There can be any number of sinks and sources. In general, the notification engine 1524 conveys notifications, which are also referred to as events or alerts, from the sources 1526-1528 to the sinks 1536-1538, based in part on parametric information stored in and/or accessed by the context analyzer 1522.

The context analyzer 1522 stores/analyzes information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have access to in different locations. Such parameters may also be functions of observations made autonomously via one or more sensors. For example, one or more profiles (not shown) may be selected or modified based on information about a user's location as can be provided by a global positioning system (GPS) subsystem, on information about the type of device being used and/or the pattern of usage of the device, and the last time a device of a particular type was accessed by the user. Furthermore, as is described in more detail below, automated inference may also be employed, to dynamically infer parameters or states such as location and attention. The profile parameters may be stored as a user profile that can be edited by the user. Beyond relying on sets of predefined profiles or dynamic inference, the notification architecture can enable users to specify in real-time his or her state, such as the user not being available except for important notifications for the next "x" hours, or until a given time, for example.

The parameters can also include default notification preference parameters regarding a user's preference as to being disturbed by notifications of different types in different settings, which can be used as the basis from which to make notification decisions by the notification engine 1524, and upon which a user can initiate changes. The parameters may include default parameters as to how the user wishes to be notified in different situations (e.g., such as by cell phone, by pager). The parameters can include such assessments as the costs of disruption associated with being notified by different modes in different settings. This can include contextual parameters indicating the likelihoods that the user is in different locations, the likelihoods that different devices are available, and the likelihoods of his or her attentional status at a given time, as well as notification parameters indicating how the user desires to be notified at a given time.

Information stored by the context analyzer 1522, according to one aspect of the present invention is inclusive of contextual information determined by the analyzer. The contextual information is determined by the analyzer 1522 by discerning the user's location and attentional status based on one or more contextual information sources (not shown), as is described in more detail in a later section of the description. The context analyzer 1522, for example, may be able to determine with precision the actual location of the user via a global positioning system (GPS) that is a part of a user's car or cell phone. The analyzer may also employ a statistical model to determine the likelihood that the user is in a given state of attention by considering background assessments and/or observations gathered through considering such information as the type of day, the time of day, the data in the user's calendar, and observations about the user's activity. The given state of attention can include whether the user is open to receiving notification, busy and not open to receiving notification, and can include other considerations such as weekdays, weekends, holidays, and/or other occasions/periods.

The sources 1526-1528, 1530 generate notifications intended for the user and/or other entity. For example, the sources 1526-1528 may include communications, such as Internet and network-based communications, and telephony communications, as well as software services. Notification sources are defined generally herein as that which generates events, which can also be referred to as notifications and alerts, intended to alert a user, or a proxy for the user, about information, services, and/or a system or world event. A notification source can also be referred to as an event source.

For example, e-mail may be generated as notifications by the prioritization system 1530 such that it is prioritized, wherein an application program or system generating the notification assigns the e-mail with a relative priority corresponding to the likely importance or urgency of the e-mail to the user. The e-mail may also be sent without regard to the relative importance to the user. Internet-related services can include notifications including information that the user has subscribed to, such as headlines of current news every so often, and stock quotes, for example.

Notification sources 1526-1528 can themselves be push-type or pull-type sources. Push-type sources are those that automatically generate and send information without a corresponding request, such as headline news and other Internet-related services that send information automatically after being subscribed to. Pull-type sources are those that send information in response to a request, such as e-mail being received after a mail server is polled. Still other notification sources include the following:

e-mail desktop applications such as calendar systems;

computer systems (e.g., that may alert the user with messages that information about alerts about system activity or problems);

Internet-related services, appointment information, scheduling queries;

changes in documents or numbers of certain kinds of documents in one or more shared folders;

availability of new documents in response to standing or persistent queries for information; and/or, information sources for information about people and their presence, their change in location, their proximity (e.g., let me know when I am traveling if another coworker or friend is within 10 miles of me"), or their availability (e.g., let me know when Steve is available for a conversation and is near a high-speed link that can support full video teleconferencing").

The notification sinks 1536-1538 are able to provide notifications to the user. For example, such notification sinks 1536-1538 can include computers, such as desktop and/or laptop computers, handheld computers, cell phones, landline phones, pagers, automotive-based computers, as well as other systems/applications as can be appreciated. It is noted that some of the sinks 1536-1538 can convey notifications more richly than other of the sinks. For example, a desktop computer typically has speakers and a relatively large color display coupled thereto, as well as having a higher bandwidth for receiving information when coupled to a local network or to the Internet. Thus, notifications can be conveyed by the desktop computer to the user in a relatively rich manner. Conversely, many cell phones have a smaller display that can be black and white, and receive information at a relatively lower bandwidth, for example. Correspondingly, the information associated with notifications conveyed by cell phones may generally be shorter and geared towards the phone's interface capabilities, for example. Thus, the content of a notification may differ depending on whether it is to be sent to a cell phone or a desktop computer. According to one aspect of the present invention, a notification sink can refer to that which subscribes, via an event subscription service, for example, to events or notifications.

The notification engine 1524 accesses the information stored and/or determined by the context analyzer, and determines which of the notifications received from the sources 1526-1528 to convey to which of the sinks 1536-1538. Furthermore, the notification engine 1524 can determine how the notification is to be conveyed, depending on which of the sinks 1536-1538 has been selected to send the information to. For example, it may be determined that notifications should be summarized before being provided to a selected sinks 1536-1538.

The invention is not limited to how the engine 1524 makes its decisions as to which of the notifications to convey to which of the notification sinks, and in what manner the notifications are conveyed. In accordance with one aspect, a decision-theoretic analysis can be utilized. For example, the notification engine 1524 can be adapted to infer important uncertainties about variables including a user's location, attention, device availability, and amount of time until the user will access the information if there were no alert. The notification engine 1524 can then make notification decisions about whether to alert a user to a notification, and if so, the nature of the summarization and the suitable device or devices to employ for relaying the notification. In general, the notification engine 1524 determines the net expected value of a notification. In doing so, it can consider the following:

the fidelity and transmission reliability of each available notification sink;

the attentional cost of disturbing the user;

the novelty of the information to the user;

the time until the user will review the information on his or her own;

the potentially context-sensitive value of the information; and/or, the increasing and/or decreasing value over time of the information contained within the notification.

Inferences made about uncertainties thus may be generated as expected likelihoods of values such as the cost of disruption to the user with the use of a particular mode of a particular device given some attentional state of the user, for example. The notification engine 1524 can make decisions as to one or more of the following:

what the user is currently attending to and doing (based on, for example, contextual information);

where the user currently is;

how important the information is;

what is the cost of deferring the notification;

how distracting would a notification be;

what is the likelihood of getting through to the user; and, what is the fidelity loss associated with the use of a specific mode of a given notification sink.

Therefore, the notification engine 1524 can perform an analysis, such as a decision-theoretic analysis, of pending and active notifications, evaluates context-dependent variables provided by information sinks and sources, and infers selected uncertainties, such as the time until a user is likely to review information and the user's location and current attentional state. Furthermore, the notification engine 1524 can access information stored in a user profile by the context analyzer 1522 in lieu of or to support a personalized decision-theoretic analysis. For example, the user profile may indicate that at a given time, the user prefers to be notified via a pager, and only if the notification has a predetermined importance level. Such information can be utilized as a baseline from which to start a decision-theoretic analysis, or can be the manner by which the notification engine 1524 determines how and whether to notify the user. to one aspect of the present invention, the notification platform architecture 1500 can be configured as a layer that resides over an eventing or messaging infrastructure. However, the invention is not limited to any particular eventing infrastructure.

Furthermore, the architecture can be configured as a layer that resides over a flexible distributed computational infrastructure, as can be appreciated by those of ordinary skill within the art. Thus, the notification platform architecture can utilize an underlying infrastructure as a manner by which sources send notifications, alerts and events, and as a manner by which sinks such as endpoint devices receive notifications, alerts and events, for example. The present invention is not so limited, however.

Figure 16:
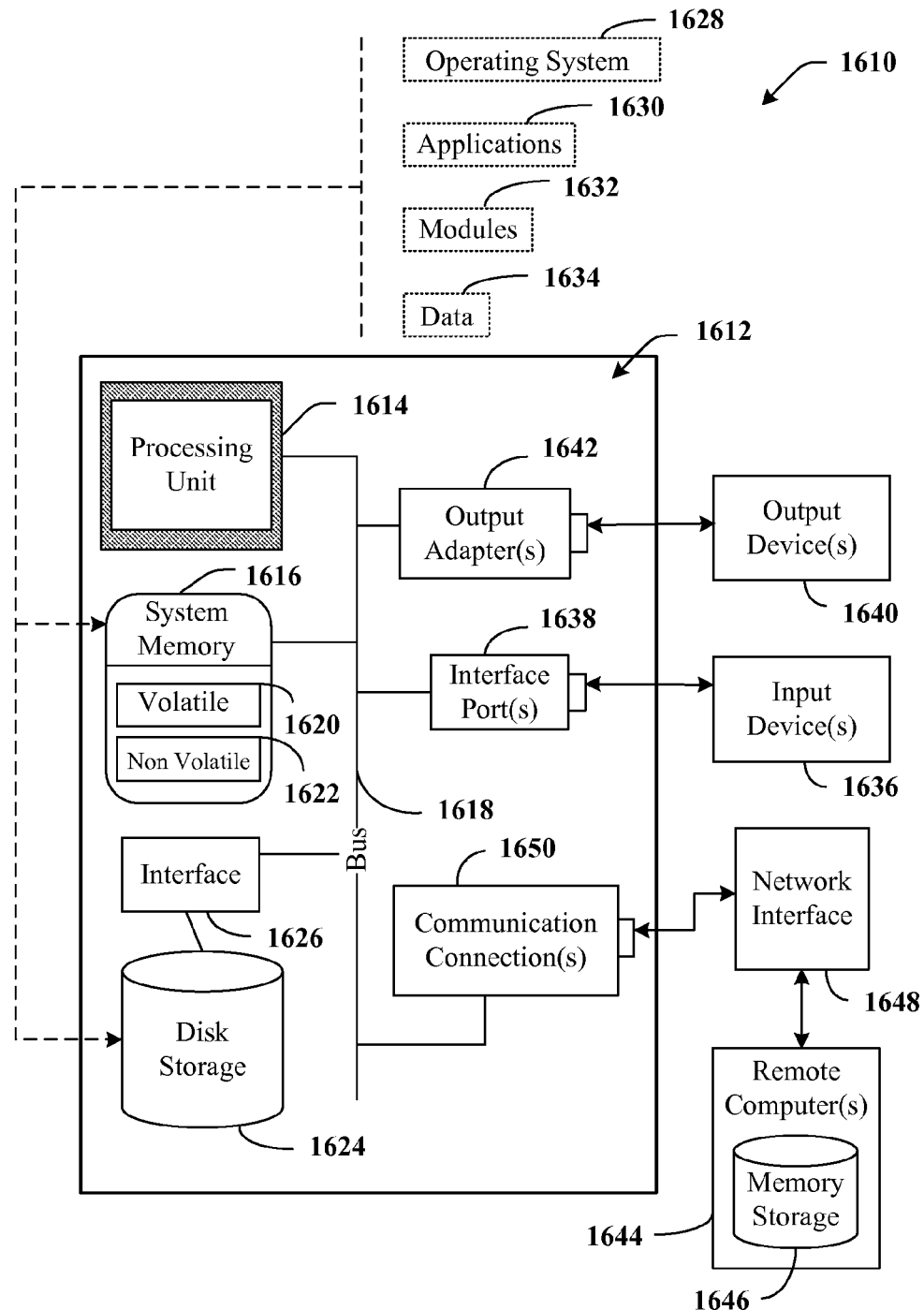
FIG. 16 is a schematic block diagram illustrating a suitable operating environment in accordance with an aspect of the present invention.

With reference to FIG. 16, an exemplary environment 1610 for implementing various aspects of the invention includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multi-processor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the present invention can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapter 1642 is provided to illustrate that there are some output devices 1640 like monitors, speakers, and printers, among other output devices 1640, that require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

Figure 17:
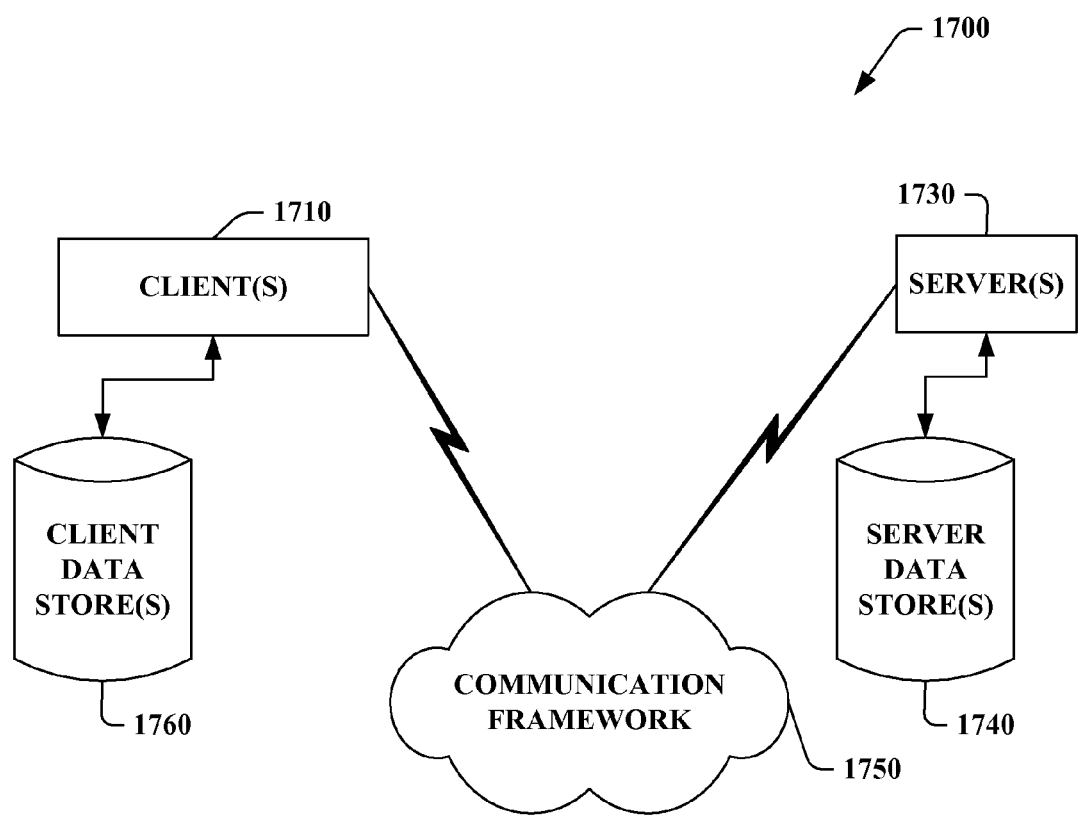
FIG. 17 is a schematic block diagram of a sample-computing environment with which the present invention can interact.

FIG. 17 is a schematic block diagram of a sample-computing environment 1700 with which the present invention can interact. The system 1700 includes one or more client(s) 1710. The client(s) 1710 can be hardware and/or software (e.g., threads, processes, computing devices). The system 1700 also includes one or more server(s) 1730. The server(s) 1730 can also be hardware and/or software (e.g., threads, processes, computing devices). The servers 1730 can house threads to perform transformations by employing the present invention, for example. One possible communication between a client 1710 and a server 1730 may be in the form of a data packet adapted to be transmitted between two or more computer processes. The system 1700 includes a communication framework 1750 that can be employed to facilitate communications between the client(s) 1710 and the server(s) 1730. The client(s) 1710 are operably connected to one or more client data store(s) 1760 that can be employed to store information local to the client(s) 1710. Similarly, the server(s) 1730 are operably connected to one or more server data store(s) 1740 that can be employed to store information local to the servers 1730.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for conveying user information, the method comprising:
   receiving first parameters from a plurality of parameter sources associated with a user, wherein the first parameters comprise contextual information describing an attentional focus of the user;
   automatically inferring an aggregate attentional state of the user based upon the first parameters received from the plurality of parameter sources associated with the user;
   receiving, from at least a first device, second parameters from a plurality of device sensors associated with the user, wherein the second parameters comprise information about a device type and a pattern of usage of the first device by the user;
   automatically inferring a location state of the user based upon the second parameters received from the plurality of device sensors associated with the user; and
   transmitting, to at least a second device, the aggregate attentional state and the location state of the user, wherein the aggregate attentional state indicates an availability of the user.

2. The method of claim 1 wherein the first device is an endpoint device.

3. The method of claim 1 wherein the second device is an endpoint device.

4. The method of claim 1 wherein the first parameters comprise information from the user's calendar.

5. The method of claim 1 wherein the first parameters comprise information about a scheduled meeting.

6. The method of claim 1 wherein the second parameters comprise information about the location of the device.

7. A system for conveying user information, the system comprising:
   a first computer system configured to:
      receive first parameters from a plurality of parameter sources associated with a user, wherein the first parameters comprise contextual information describing an attentional focus of the user;
      automatically infer an aggregate attentional state of the user based upon the first parameters received from the plurality of parameter sources associated with the user, wherein the aggregate attentional state indicates an availability of the user;
      receive second parameters from one or more device sensors associated with the user, wherein the second parameters comprise information about a device type and a pattern of usage of the device by the user;
      automatically infer a location state of the user based upon the second parameters received from the one or more device sensors associated with the user; and
      transmit the aggregate attentional state and the location state of the user to a third computer system; and
   a second computer system configured to:
      transmit a plurality of parameters including at least one of the first parameters and the second parameters to the first computer system.

8. The system of claim 7 wherein the device is an endpoint device.

9. The system of claim 7 wherein the first parameters comprise information from the user's calendar.

10. The system of claim 7 wherein the first parameters comprise information about a scheduled meeting.

11. The system of claim 7 wherein the second parameters comprise information about the location of the device.

* * * * *